United States Patent [19]
Nishiyama

[11] Patent Number: 5,550,714
[45] Date of Patent: Aug. 27, 1996

[54] SCHEMATIC GENERATOR AND SCHEMATIC GENERATING METHOD

[75] Inventor: Tamotsu Nishiyama, Hirakata, Japan

[73] Assignee: Matsushita Electric Industrial Co. Ltd., Osaka, Japan

[21] Appl. No.: 403,452

[22] Filed: Sep. 6, 1989

[30] Foreign Application Priority Data

Sep. 9, 1988 [JP] Japan .................. 63-227030

[51] Int. Cl.$^6$ .................................................. G06F 17/50
[52] U.S. Cl. .......................................... 364/490; 364/489
[58] Field of Search ................................ 364/488, 489, 364/490, 491

[56] References Cited

U.S. PATENT DOCUMENTS

| | | | |
|---|---|---|---|
| 3,735,109 | 5/1973 | Berthelemy et al. | 364/801 |
| 4,752,887 | 6/1988 | Kuwahara | 364/491 |
| 4,813,013 | 3/1989 | Dunn | 364/900 |
| 4,852,015 | 7/1989 | Doyle, Jr. | 364/491 |
| 4,855,929 | 8/1989 | Nakajima | 364/490 |
| 4,868,785 | 9/1989 | Jordan et al. | 364/900 |
| 4,914,568 | 4/1990 | Kodosky et al. | 364/578 |
| 4,922,432 | 5/1990 | Kobayashi et al. | 364/489 |
| 5,038,294 | 8/1991 | Arakawa et al. | 364/491 |
| 5,046,012 | 9/1991 | Morishita et al. | 364/491 |

FOREIGN PATENT DOCUMENTS

| | | |
|---|---|---|
| 60-176177 | 9/1985 | Japan . |
| 60-205672 | 10/1985 | Japan . |
| 61-204775 | 10/1986 | Japan . |

OTHER PUBLICATIONS

"Automatic Generation of Digital System Schematic Diagrams" by Arya et al., IEEE 22nd Design Automation Conf., 1985, pp. 388–395.

"Outline of System for Automacally Creating Drawing for Functional Logic Design" by Manabe et al., 30th National Conf. (First Half of 1985) of the Information Processing Society of Japan, pp. 1935–1936.

"Enhancing Knowledge Representation in Engineering Databases" by D. J. Hartzband et al., IEEE Trans. on Computer, Sep. 1985, pp. 39–48.

T. Hasegawa, et al, "A Visibility–Oriented Construction System for Logic Diagrams," Systems and Computers in Japan, vol. 17, No. 7, pp. 40–48, Jul. 1986.

E. Dekel, et al, "A Parallel Matching Algorithm for Convex Bipartite Graphs and Applications to Scheduling", Journal of Parallel and Distributed Computing, vol. 1, No. 2, pp. 185–205, Nov. 1984.

Technical Report CAS84–134 (1984), The Institute of Electronics and Communication Engineers of Japan, pp. 47 to 54.

30th National Conv. Record of the Info. Processing Society of Japan (1st period of 1985), pp. 1901–1904, 1973, 1974.

Computer–Aided Design, vol. 15, No. 3, May 1983, pp. 115–122.

24th ACM/IEEE Design Automatic Conf. (Paper 25.4), pp. 435–442.

*Primary Examiner*—Vincent N. Trans
*Attorney, Agent, or Firm*—Watson Cole Stevens Davis, P.L.L.C.

[57] ABSTRACT

Disclosed is here units or processing steps respectively for detecting loops in a logic circuit to determine logic levels associated with first coordinates of respective elements such that a location where the overlapping of the loops develop the maximum value is assigned as a feedback routing, for determining positional relationships between elements at the reference level to relieve congestion of routings in the vicinity of the reference level, for sequentially achieving the maximum matching on a bipartite graph constituted with connective relationships of the elements for each level beginning from the reference level to determine positional relationships related to second coordinates so as to assign elements associated with each other to the same position, and for defining virtual routing length to achieve routing in accordance with a result of sorting by use of the virtual routing lengths.

45 Claims, 17 Drawing Sheets

FIG. 2

```
inv00:::
        size :: [ (0,-2) , (5,2) ] ;
        in( i ) :: (0,0);
        out(o) :: (5,0).
and2OI:::
        size :: [ (0,-1) , (6,3) ] ;
        in(ia) :: [ (0,2) , (0,0) ] ;
        out(o) :: (6,1).

and3OI:::
        size :: [ (0,-1) , (6,3) ] ;
        in(ia) :: [ (0,2) , (0,1) , (0,0) ] ;
        out(o) :: (6,1).
```

FIG. 3

```
devI:::
                a_kind_of :: inv00;
                input(i) :: kI ;
                output(o) :: netI .
dev3:::
                a_kind_of :: and3OI;
                input(ia) :: [k2,k4,netI] ;
                output(o) :: net3.
dev5:::
                a_kind_of :: and2OI;
                input(ia) :: [net3,net4];
                output(o) :: f .
```

```
dev1 :::
        a_kind_of       :: inv00 ;
        position        :: ( 12 , 13 ) ;
        angle           :: 0 ;
        mirror          :: false .
dev3 :::
        a_kind_of       :: and301;
        position        :: ( 25 , 18 ) ;
        angle           :: 0 ;
        mirror          :: false .
dev5 :::
        a_kind_of       :: and201;
        position        :: ( 39 , 17 ) ;
        angle           :: 0 ;
        mirror          :: false.
net1 :::
        a_kind_of       :: wire ;
        io              :: [ ( 17 , 13 ) , ( 25 , 18 ) ] ;
        net             :: [ [ ( 17 , 13 ) , ( 21 , 13 ) ,
                               ( 21 , 18 ) , ( 25 , 18 ) ] ] .
net3 :::
        a_kind_of       :: wire ;
        io              :: [ ( 31 , 19 ) , ( 39 , 19 ) ] ;
        net             :: [ [ ( 31 , 19 ) , ( 39 , 19 ) ] ] .
```

FIG. 11
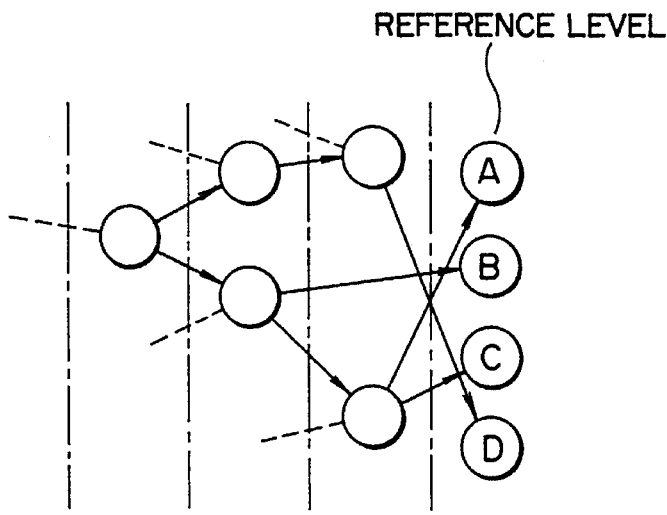
FIG. 12
| PAIR | LEVEL DIFFERENCE | DEGREE OF CONSANGUNITY |
|---|---|---|
| A-C : | ( 1 , 2 ) | |
| B-C : | ( 2 , 3 ) | |
| A-B : | ( 2 , 3 ) | |
| B-D : | ( 3 , 5 ) | |
| A-D : | ( 3 , 6 ) | |
| C-D : | ( 3 , 6 ) | |
FIG. 13
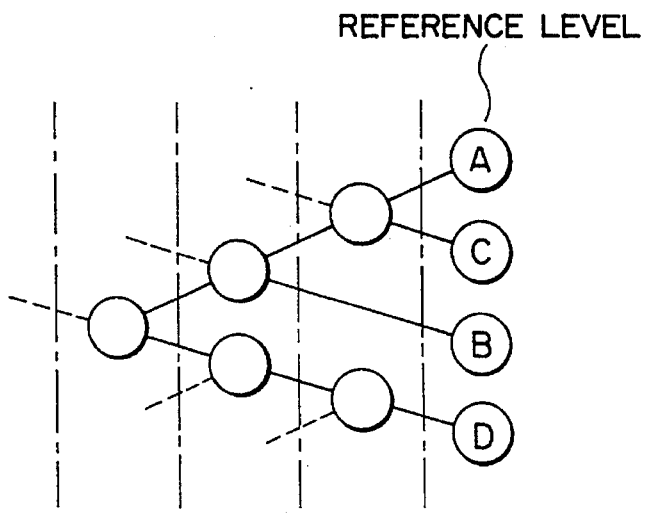

F I G. 23
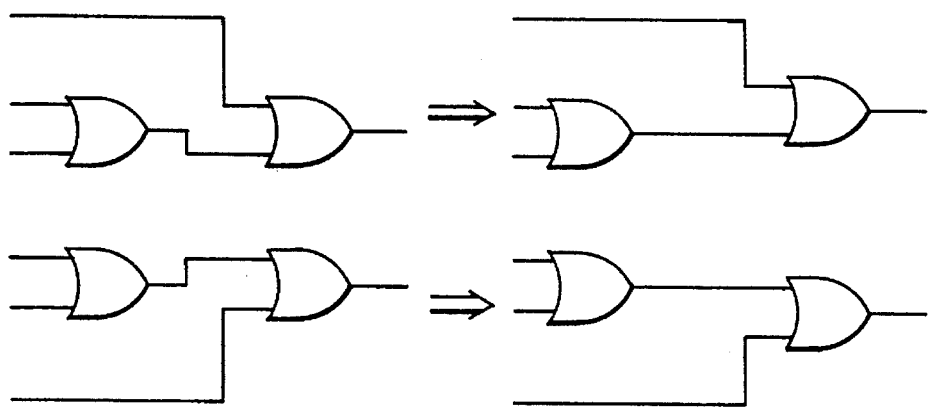
PLACEMENT WITH
GLOBAL COORDINATE
PLACEMENT WITH LOCAL COODINATE
ALSO TAKEN INTO CONSIDERATION

DIRECTION OF FIRST COORDINATE

SCHEMATIC GENERATOR AND SCHEMATIC GENERATING METHOD

BACKGROUND OF THE INVENTION

The present invention relates to a system for automatically drawing net diagrams including a logic diagram, a process diagram, a relational tree diagram, a layout of a printed circuit board, and in particular, to a schematic generating method of automatically generating net diagram or logic circuit diagram and a schematic generator or system using the method suitable for generating a logic diagram, a functional diagram, or a circuit diagram in which signal flows are easily traceable based on circuit parts such as circuit elements and constituent circuits and connective information about connections therebetween.

For the conventional schematic generator, various proposals have been presented. For example, articles of such proposals have been described in the JP-A-61-204775, "A Method of Generating a Logic Diagram" in the Technical Report CAS84-134 published in 1984 from the Institute or Electronics and Communication Engineers of Japan, the JP-A-60-205672, and the JP-A-60-176177.

In an ordinary schematic generator, an entire logic circuit is subdivided through a logic division such that for each subdivided portion, arrangement of diagram drawing symbols of respective circuit parts and the like are determined in the subdivided constituent circuit through an automatic placement or placement. Routings between the circuit parts are determined through an automatic routing. In another ordinary schematic generator, the circuit parts are arranged so as to be thereafter divided, thereby generating a logic circuit diagram. These methods produce a clear diagram primarily by subdividing a logic circuit diagram in an effective fashion, by employing a hierarchic representation of the logic circuit diagram, or by using properties of particular circuit parts other than the connective relationships between the circuit parts.

Moreover, conventionally, according to a method of arranging circuit parts of a logical circuit diagram in the schematic generating method, locations in which drawing symbols are allocatable are limited to positions defined by assuming a checkerboard or grid on the objective diagram. The placements are then sequentially determined beginning from an end of the diagram in a fixed direction (for example, from an output side to an input side or in a reverse direction thereto) according to the connective relationships between the drawings symbols (namely, between the circuit parts). In a procedure to decide the placements, each drawing symbol is assigned with a level (namely, a column for placement) based on the connective relationships with an input terminal (or an input port) or an output terminal (or an output port) set as a start point or an initial point. Subsequently, intersection of the routings between the drawing symbols of the previous column (level) already assigned with positions and drawing symbols to be positioned, or the total length of the routings is minimized so as to sequentially allocate the drawing symbols of the respective columns. However, the number of placements is not necessarily limited to one. Usually, a sequential position decision from the output terminal (or the input terminal) to the input terminal (or the output terminal) and a sequential position decision in the reverse direction are repeatedly executed, thereby determining a better placement in an ordinary case. This method however is considerably less advantageous as compared with a diagram manually produced by use of a computer aided system (CAD) such as a diagram editor with regard to visibility or easy understanding of the diagram. Incidentally, for information about this type of method, reference is to be made, for example, to pages 1901 to 1904 and pages 1973 to 1974 of the 30th National Conventional Record of the Information Processing Society of Japan (1st period of 1985), the JP-A-61-204775, and pages 47 to 54 of the Technical Report CAS84-134 published in 1984 from the Institute of Electronics and Communication Engineers of Japan.

According to the conventional example above, for the placements of the drawing symbols representing the respective circuit parts and routings or routing therebetween, usually, provisional placements and routings are once determined so as to correct the resultant placements or routings in view of being easy to see. This operation however is attended with a disadvantage of a low processing efficiency. Furthermore, in the procedure of allocating the drawing symbols, the parts are located in the positions of the centers of gravity in which the parts are connected with one other or the positions in which the total routing length will be minimized. In addition, in the allocate processing, the visibility of the routings to be processed later has not been taken into consideration. As a result, a produced logic circuit diagram does not have a satisfactory visibility in some cases. Moreover, the schematic generating method has been strongly dependent on a utilization purpose thereof and on characteristics and technologies of an objective circuit, namely, considerations are not given to the generalized utilization.

SUMMARY OF THE INVENTION

It is therefore an object of the present invention to provide a schematic generating method, or a schematic generator using the same which is capable of effecting efficient arrangement and routings or routing of a net diagram or logic circuit diagram in which connective relationships are clearly expressed and the schematically represented content is easily understood, thereby removing the problems of the prior art technology.

The object above can be achieved in a method of assigning levels to nodes of a net diagrams by providing a first step for detecting loops in the net diagram of a circuit, a second step for detecting in the loops attained by the first step a location in which an overlapping of the loops develops a maximum value, and a third step for determining a disconnecting point in the loops of the location detected by the second step.

Alternatively, the above object is achieved in the method by providing a fourth step for effecting a maximum matching on a bipartite graph comprising a set of nodes for which positional relationships are beforehand determined, a set of nodes for which positional relationships are not determined, and connective relationships therebetween so as to determine the positional relationships such that the nodes having a correspondence therebetween as a result of the maximum matching are located to an identical position and a fifth step operative, when there exist nodes not saturated by the maximum matching in the fourth step, for determining the positional relationships thereof based on direct or indirect connective relationships with respect to the nodes for which the positional relationships are beforehand determined. In this case, after the positional relationships of all nodes are sequentially determined, placements in a direction vertical to a level direction are determined based on the obtained positional relationships.

Alternatively, the above object can be achieved in the method by providing a sixth step in which when positional relationships between nodes at a reference level or nodes as a reference of placements are determined, assuming an arc as a father-son relationship for any combination of each pair including two said nodes, the sum of numbers of arcs are attained in a range from the paired two nodes to the common descendant (or the ancestor) and a difference between a level of the paired two nodes and a level of the descendant (or an ancestor), thereby setting priority sequence of the respective pairs with the higher priority assigned to the smaller value of the minimum values of the total numbers of the arcs or of the level differences and a seventh step for determining positional relationships such that a pair having the higher priority is located at the nearer position.

Furthermore, the above object can be achieved in a method for sequentially conducting a routing between nodes in a net diagram for each region including each column (or each row) of nodes by providing a tenth step for determining a routing path or route based on a positional relationship between a node at a start point of a connecting line and an end point thereof, an eighth step for achieving a routing processing of each said region in accordance with a routing sequence predetermined for each routing pattern determined by positions respectively of the start and end points of each connecting line in each said region and for determining, when a plurality of connecting lines pass a routing path in said routing processing, a virtual routing length, for each connecting line in said routing path, from a position of a bending point thereof, and a ninth step for routing each said connecting line in the routing path according to a sequence of the virtual routing length.

Alternatively, the above object above can be achieved by providing second means for keeping information about a contour or shape of each placement element (inclusive of a drawing symbol) of a logic circuit diagram, a step A for determining a first global coordinate and a second global coordinate so as to decide a global placement to determine an approximate position of each said placement element, a step B for effecting; based on the global placement of said each placement element, connective relationships therebetween, and the contour of each said placement element obtained in said step A; a physical placement of each placement element including determination of local coordinates and an orientation of each said placement element and an placement of pin positions of each said placement element, a step C for routing, in a net routing method according to claim 9, the connecting lines for each first global coordinate by use of the global coordinate and the local coordinate, and a step D for determining an absolute coordinate of a position of each said placement element and an absolute coordinate of each said routing based on the global coordinate and the local coordinate.

As described above, according to the present invention, from the loops appearing in a network diagram (or a circuit diagram), loops detected in the first step undergoes the second step so as to detect a location where overlapping of the detected loops develops the maximum value, so that the third step determines a disconnecting point from these maximum overlapping locations. This operation is repeatedly achieved in a sequential fashion to disconnect all the loops, which enables the number of feedback routings in the net diagram (or circuit diagram) after the placement and routing to be minimized. As a result, the connective relationships and the signal flows becomes to be easily understood.

Alternatively, in the step 4, the nodes associated with each other as a result of the maximum matching of the bipartite graph are arranged at an identical global coordinate position; furthermore, in a case where a plurality of maximum matchings of the bipartite graph are present, the nodes having the greater level difference takes precedence, thereby sequentially determining the positional relationships. As a result, in the net diagram (or the circuit diagram) after the placement and routing, the number of routings each drawn as a line similar to a direct line without having a bending portion are increased, the connective relationships or the signal flows become to be easily understood, and the overall connective relationships are traceable at once, thereby creating the diagram with a high visibility. Furthermore, unlike the conventional placement method using the center of gravity, the present method unnecessitates the placement correction after the placement is once finished, which enables the processing to be efficiently accomplished.

Alternatively, by use of the sixth and seventh steps, the positional relationships between nodes (or elements) as reference of the placement can be established so as to allocate nodes having the stronger relationship (indirect relationship) at the nearer position. In consequence, in a net diagram (or a logic circuit diagram), the complexity of routing or routing in the proximity of the reference level can be mitigated. This enables the diagram to be produced with a high visibility and unnecessitates the correction of the placement after the routing is completed in the vicinity of the reference level, thereby effectively achieving the placement or placement processing.

Alternatively, in the tenth step, for routings of connecting lines between nodes (or elements), the routing paths can be easily determined from the positional relationships between the respective nodes or elements at the start and end points of the connecting lines. When a plurality of connecting lines (partially) share an identical routing path, by use of the virtual routing lengths obtained for the shared portions of the connecting lines in the seventh step, the connecting lines are sorted in the eighth step. As a result, a net diagram (or a circuit diagram) having a reduced number of intersections between routings can be easily produced through a simple processing. In consequence, the visibility of the diagram is increased; furthermore, once the routing processing is completed, a correction thereof to reduce routing intersections need not be achieved, thereby increasing the efficiency of the routing operation.

Moreover, since the second means keeps information related to the contour of each element (namely, each placement component) to be employed in the logic circuit diagram, in a case where available elements are to be changed, only a portion kept in the second means are required to be modified. Consequently, a schematic generator for producing a logic circuit diagram dependent neither on the utilization purpose of the logic circuit diagram nor on the technology of the circuit can be implemented. Moreover, since the step B enables, for each element appearing in the logic circuit diagram, signals to be assigned to logically equivalent pins (namely, equivalent terminals) of the element based on a forecast of the routing paths; after the routing is once finished, it is not necessary to correct the routings by exchanging the logically equivalent pins to reduce routing intersections.

With the provisions above and by providing the global coordinate and the local coordinate to be used in the step D, through an operation process of placement and routing, a logic circuit diagram with a satisfactory visibility can be automatically produced without necessitating the correction of placement and routing after the placement and routing are completed.

BRIEF DESCRIPTION OF THE DRAWINGS

These and other objects and advantages of the present invention will become apparent by reference to the following description and accompanying drawings wherein:

FIG. 2 is an explanatory diagram useful to explain an example of contour information;

FIG. 3 is an explanatory diagram useful to explain an example of net information;

FIG. 11 is an explanatory diagram useful to explain a portion of a net diagram assigned with levels;

FIG. 12 is an explanatory diagram useful to explain a priority order of node pairs;

FIG. 13 is an explanatory diagram useful to explain a net diagram example after positional relationships are determined for the reference level;

FIG. 23 is a logic circuit diagram for explaining determination of precise positions of placement elements;

DESCRIPTION OF THE PREFERRED EMBODIMENTS

Figure 1:
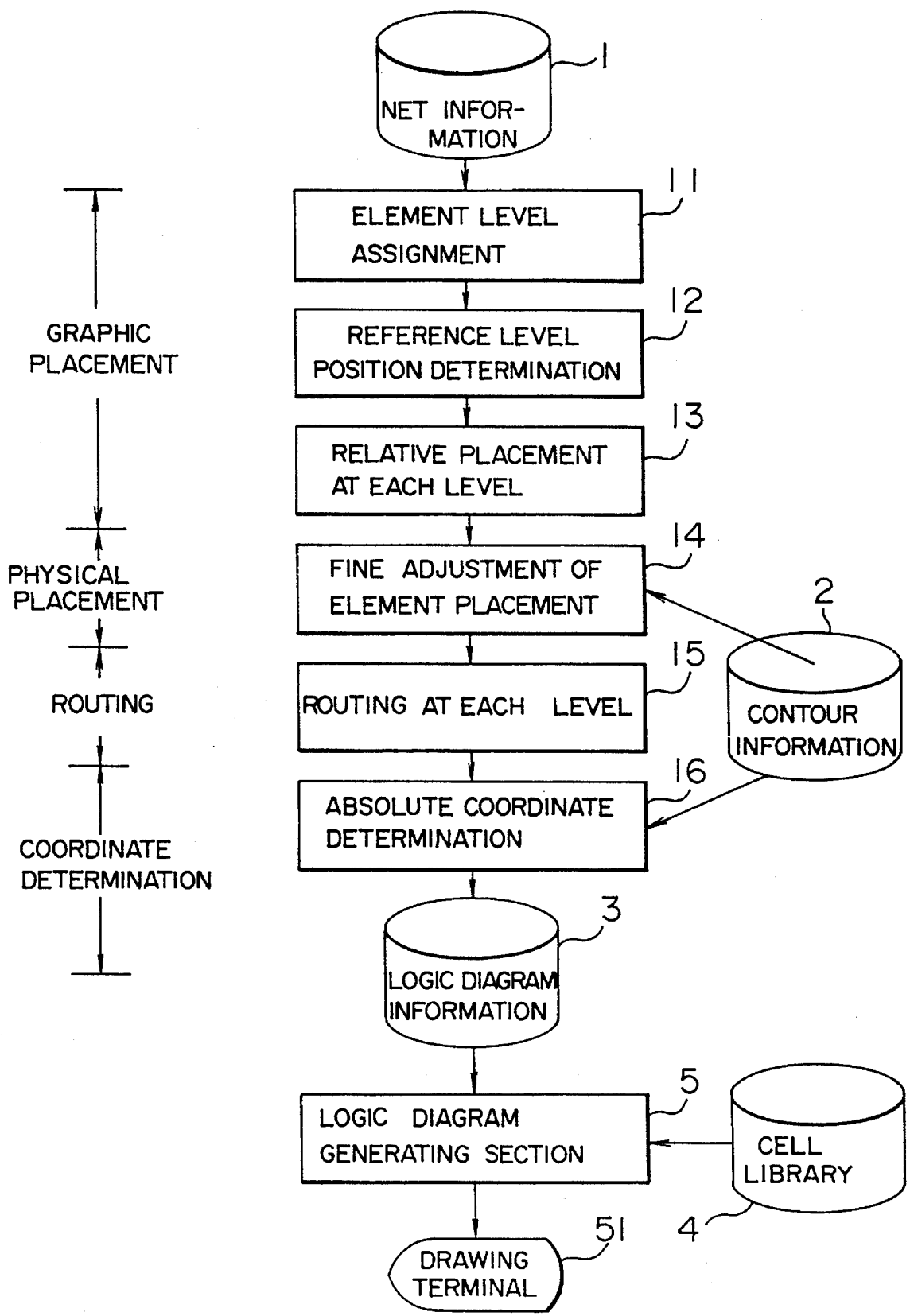
FIG. 1 is a schematic configuration diagram of a schematic generator of automatically producing a logic circuit diagram as an embodiment according to the present invention.

Referring now to the drawings, a description will be given of an embodiment according to the present invention.

Particularly, although this embodiment is an example of an automatic generation of a logic circuit diagram based on connective information (i.e. a net list) of a logic circuit, creation of the other net diagrams will be easily inferred from the description.

Overall System Configuration

FIG. 1 shows a schematic generator for automatically generating a logic circuit as an embodiment according to the present invention. This system includes a net information file 1 storing therein information about elements (including circuit parts) and connective or connecting information thereof, a contour information file 2 for storing therein contour or shape information of drawing symbols representing respective elements, a logic diagram information file 3 for storing therein drawing information about placements or placements and wirings or routings of a logic circuit diagram (also called a logic diagram), a cell library 4 storing therein contour information and functional information of each element, logic diagram drawing section 5 for receiving as an input thereto the logic diagram information to draw a logic circuit diagram by use of a drawing terminal 51 such as a display or a plotter, and a placement/routing processing section 11–16.

For example, the net information file 1 keeps a net list (connective information) or the like of a logic circuit obtained as an output from an automatic logic synthesizing system or an automatic circuit transforming system. Information stored in the net information file 1 may also be employed for a logical vertification, a timing check, an automatic layout system, etc.

In the element level assignment 11, based on the number of logical stages from an input port (input terminal) of each of the elements and the circuit parts contained in the net list kept in the net information file 1, a level is determined for each element and for each circuit part.

In the reference level position determination 12, the system determines positional relationships in a direction orthogonal to a level direction between the elements or circuit parts at the reference level (namely, sequential relationships for placing or arranging elements or circuit parts in a direction vertical to the level direction). In this embodiment, for simplification, the maximum level (i.e. a level at which an output port exists) is set as the reference level; however, even if a level at which an input port exists (namely, level 0) is set as the reference or elements and circuit parts at a plurality of levels are assigned with the reference level, there does not occur any problem.

In the relative placement at each level 13, based on sequential relationships of positions of the elements (i.e. components or circuit parts) at the reference level, positional relationships of positions are determined for elements at the next level (in this embodiment, at the next level in the descending order), thereby determining sequential relationships of positions for all elements of the logic circuit.

In the placement processing 11 to 13, few considerations have been given to the contour of each placement element (namely, to the contour of each drawing symbol of the elements and circuit parts). In consequence, assuming that the level of each element determined through the placement steps 11 to 13 is a first (global) coordinate and that a sequence obtained from sequential relationships of positions also determined through the placement steps 11 to 13 is a second (global) coordinate, graphic placement (not related to the contour) is determined for each element.

Incidentally, in this example, the sequential relationships of positions at each level are determined in a descending order. However, when the reference level is set to the level 0, the relationships are to be determined in the ascending level order; whereas in other cases, the relationships are to be determined in both directions including the ascending and descending level orders.

On the other hand, the contour information file 2 keeps information related to the contour of each drawing symbol used in a logic diagram. As an example, FIG. 2 shows the contour information kept in the contour information file 2. This example includes sizes (size), positions of input pins (in(i) and in(ia)), and positions of output pins (out(o)) of drawing symbols of an inverter, a 2-input AND gate, and a 3-input AND gate. These positions are represented by use of relative coordinates with respect to the reference point of the respective symbol. However, the size of a drawing symbol is expressed with a pair of the minimum and maximum coordinates of vertices of a rectangle circumscribing the symbols.

In the fine adjustment of element placement 14, based on the first and second coordinates of each placement element determined in the processing 11 to 13, the placement or placement thereof is roughly decided. Thereafter the system allocates signals to pins to determine connections between pins of each element and signal lines thereto so as to minimize bending portions and intersections of routings, orientations of the respective placement elements, and precise coordinates thereof by use of the contour information of the respective placement elements. In consequence, the processing 14 physically allocates the elements with consideration of the orientations (including the mirror inversion) thereof and positions and sizes of pins, thereby determining placements of the elements in the diagram.

In the routing at each level 15, connecting signals between placement elements determined by the placement processing above are sequentially wired so as to determine the routes or routings between all placement elements. In this embodiment, although the description will be given of only a case where the routing is sequentially achieved for each level in order of the higher beginning from the output port side, the routing of the other cases may also be easily inferred from the description. Incidentally, the coordinate of the routing is represented by use of the global coordinate determined in the processing 11 to 13 and the local coordinate which is the detailed coordinate information obtained in the processing 14.

In the absolute coordinate determination 16, based on the resultant data of the processing above including the allocating positions of the respective elements and the global and local coordinates representing the routing positions, the absolute coordinates of placements and routings of the overall logic circuit diagram are determined so as to be stored in the logic diagram information file 3.

Figures 4, 5:
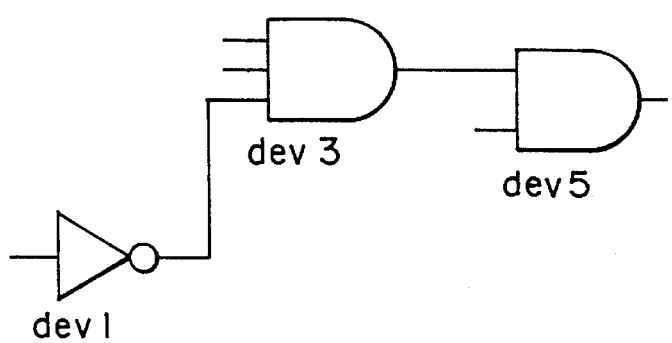
FIG. 4 is an explanatory diagram useful to explain an example of logic diagram information.
FIG. 5 is a logic circuit diagram showing an output example of a logic circuit diagram.

FIG. 3 shows an example of a net list to be stored in the net information file 1. This example indicates that an element of dev1 has a cell name inv00, an input signal k1, and an output signal net1, etc. FIG. 4 shows an example of logic diagram information to be kept in the logic diagram information file 3 in a case where the contour information file 2 before hand keeps contour information of FIG. 2 such that an example of FIG. 3 is inputted in this state by the system so as to execute the processings 11 to 16. In the example of FIG. 4, there are indicated placement information such that an element dev1 with a cell name inv00 has position of a reference point represented with a coordinate (12, 13) and a rotary angle is 0 without the mirror inversion and routing information such that end points of a signal line with a signal name net1 are denoted by coordinates (17, 13) and (25, 18) so as to link coordinates (17, 13), (21, 13), (21, 18), and (25, 18).

Furthermore, when the logic diagram information of FIG. 4 is supplied to the logic diagram generating section 5, a logic diagram as shown in FIG. 5 is outputted on the drawing terminal (i.e. a display, a plotter, or the like) 51.

Incidentally, the logic diagram generating section 5 is ordinarily a logic diagram edit system (schematic editor), which is provided with the cell library 4 and the drawing terminal 51. In this situation, integrity is required to be preserved between the information kept in the contour information file 2 and the content of the cell library 4.

Next, a description will be given in detail of the placement/routing processings 11 to 16.

Element Level Assignment

A method of assigning levels to nodes of a net diagram according to the present invention will be described by referring to FIG. 6.

Figure 6:
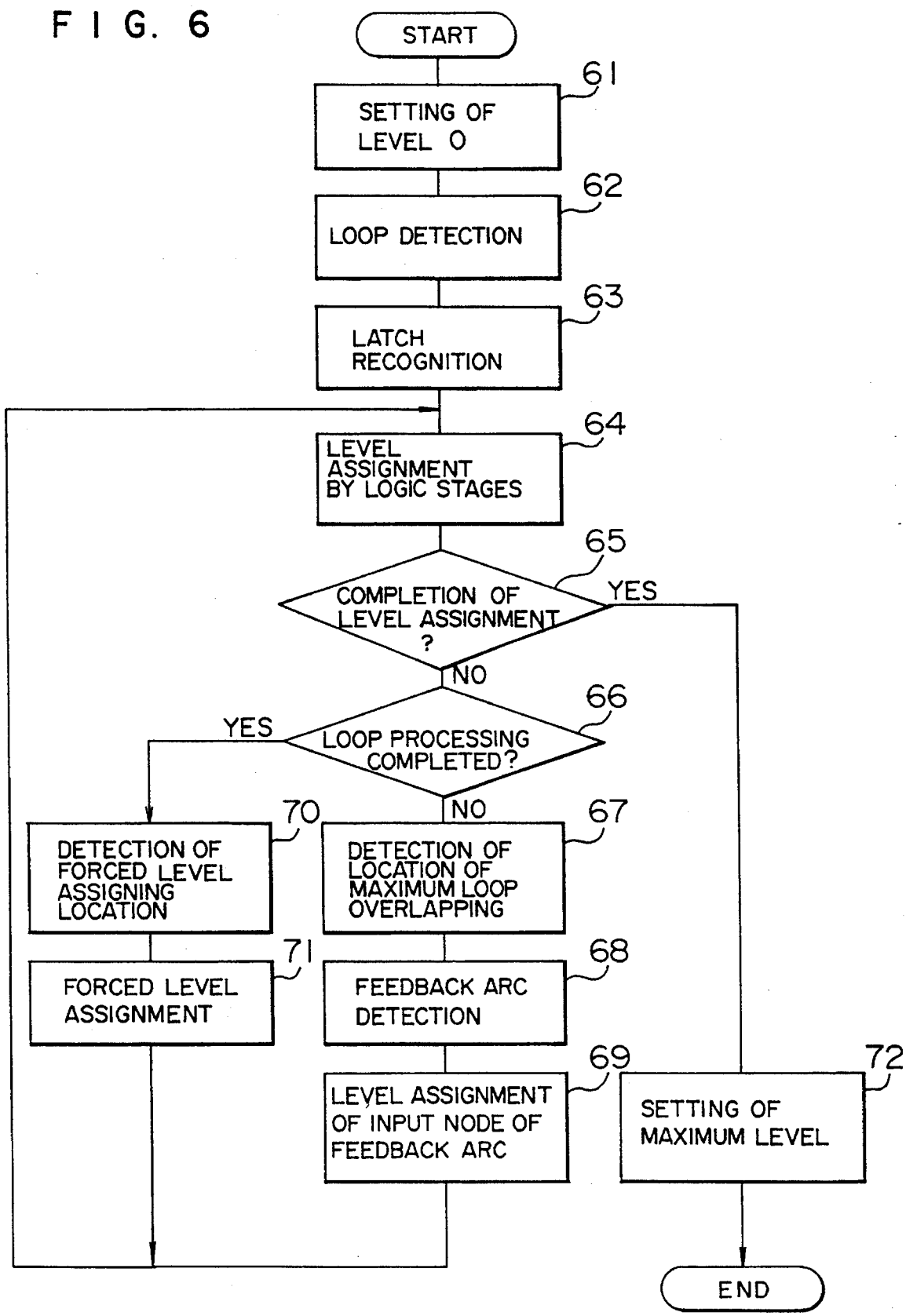
FIG. 6 is a flowchart showing an example of processing to assign levels to elements.

FIG. 6 is a flowchart showing an example of a detailed processing procedure of the element level assignment 11. A step 61 is disposed to set level 0. In this embodiment, all input ports are assigned with level 0. However, for a circuit not having any input port, level 0 may possibly be assigned to an element or a circuit part which does not receive any input.

In a step of loop detection 62, loops are detected in the circuit based on the net list to produce loop information. For example, in a case of an example of a net diagram shown in FIG. 7, three loops: (1) A→B→H→F→D→A, (2) A→C→E→F→D→A, and (3) H→F→D→G→I→H are detected to create loop information as shown in FIG. 8. However, in the example of FIG. 8, loop information is stored in a data structure of a list format. Arrows in this diagram represent pointers.

Figure 7:
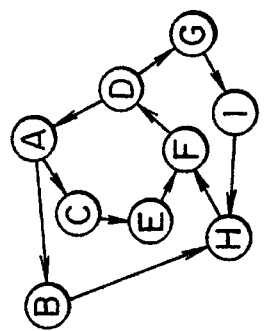
FIG. 7 is an explanatory diagram useful to explain an example of a net diagram.
Figure 8:
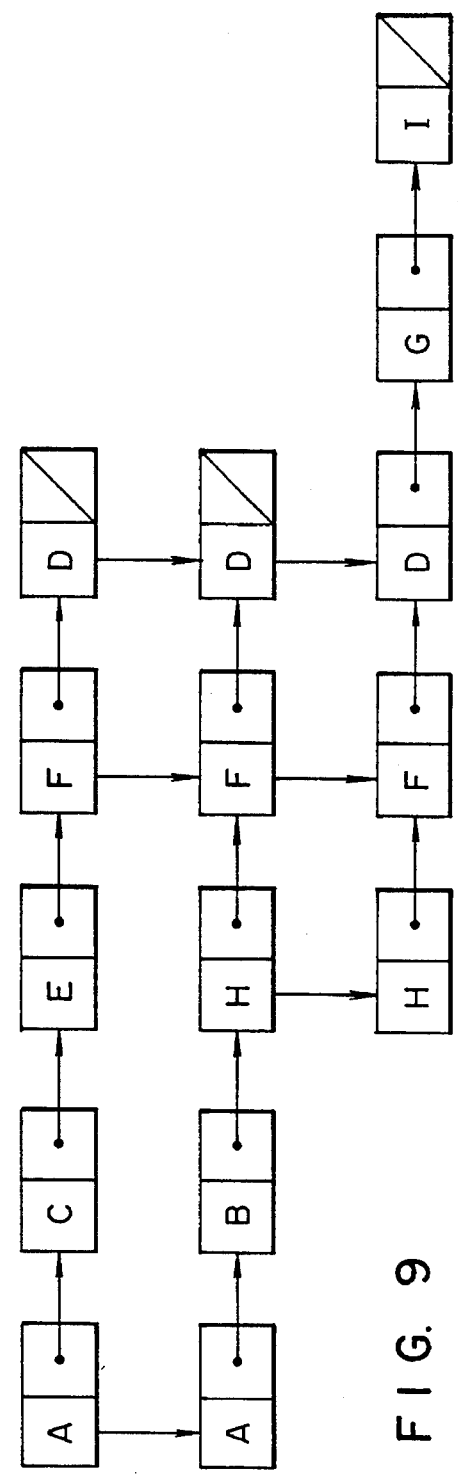
FIG. 8 is an explanatory diagram useful to explain an example of a data structure keeping loop information.

Incidentally, referring to an example of a net diagram of FIG. 7, if the elements and signal lines of a logic circuit diagram are respectively assumed to be nodes and arcs, the logic circuit diagram may be considered as a kind of a net diagram. Although this embodiment detects all loops, the system need not necessarily detect all loops.

In a latch recognition 63, the loops detected in the loop detection 62 are checked so as to extract any loops having a latch structure. Namely, of all loops, any loop comprising a pair (latch pair) of two nodes (elements) is detected so as to be removed from the loop information. Thereafter, subsequent processing is executed on assumption that these pairs are at the same level. However, in a case where a node is included in a plurality of latch pairs, it may be possible to adopt a selection method to select, from the pairs, one having the smaller number of input arcs thereto.

In a level assignment by logic stages 64, each node (element) is sequentially assigned with a level in a method such that if all nodes (elements) connected to an input of an assignment objective node (element) are assigned with levels and the maximum value of the levels is L, the pertinent node (element) is assigned with a level L+1.

Incidentally, for a latch pair, a simple method may be adopted in which the latch pair is assumed to be a node (element).

In a judge processing 65, the system judges to determine whether or not all nodes (elements) have been assigned with levels. If yes, a maximum level assignment 72 is processed; otherwise, the judge processing 66 is continuously executed.

Incidentally, in this embodiment, the processing steps 64 and 65 are applied to the nodes (elements) other than an output port.

In a judge processing 66, it is judged to determine whether or not the loop information is empty. If empty, the loop processing has been completed and hence a processing step 70 is executed; otherwise, the loop processing has not been completed yet and hence the processing 68 is achieved. In this description, when the loop information is empty, it is assumed that the loop information does not contain any loop registered thereto.

In a processing step 67, the system detects, based on the loop information, a location (i.e. an arc) where the overlapping of a plurality of loops develops the maximum value.

For example, in an example of FIG. 8, the degree of overlapping between the arcs D→A and H→F is two; whereas the overlapping degree of F→D is three. Consequently, the location of the maximum overlapping degree is determined to be the arc F→D. In this example, only one location is associated with the maximum overlapping degree; however, if a plurality of locations are related to the maximum overlapping degree, the system determines all the locations.

In a processing step 68, the locations (arcs) of the maximum overlapping degree are checked to set an arc as a feedback arc. That is, a node having the feedback arc as an input thereto is determined and all loops which includes the pertinent node are removed from the loop information.

For example, in the example of FIG. 8, the arc F→D is selected as the feedback arc and the node D is determined as the objective node. In consequence, all loops of FIG. 8 are removed and the loop information becomes empty.

Furthermore, in a case where a plurality of arcs of maximum overlapping degree exist in this embodiment, from among the start point nodes of input arcs to the nodes having the respective arcs of the maximum overlapping degree as inputs thereto, the system employs a method to sequentially select a node in the priority order of ① a node associated with a smaller number of nodes to which levels are not assigned, ② a node associated with a greater number of nodes to which levels are assigned, or ③ a node associated with a smaller value of the maximum level of the nodes to which levels are assigned, thereby determining a node as an input destination of the feedback arc. However, various combinations of the priority rules ①, ②, or ③ may be applicable.

Incidentally, in this embodiment, a case in which the overlapping of arcs develops the maximum value has been considered; however, a case where the overlapping of nodes takes the maximum value may also be easily analogized from the description.

In a processing step 69, the node determined in the step 68 (namely, the input destination node of the feedback arc) is assigned with a level. As a method of assigning a level to an objective node, in a case where, of the start point nodes of the input arcs to the objective node, the nodes already assigned with levels have the maximum level M; the objective node is then assigned with a level M+1. In this processing, after a level is assigned to at least a node in the loop, the step 64 is executed again.

Incidentally, in a case where any start point nodes of the input arcs to the node determined in the step 68 are not assigned with levels, a method similar to a method used in a processing step 71, which will be described later, is adopted to assign levels to the nodes.

In a processing step 70, the nodes not assigned with levels in the processings 64 to 69 are checked so as to determine a node to be next assigned with a level. More concretely, the system selects a node not having an input arc.

In a processing step 71, a level is assigned to the node determined in the step 70. For example, the nodes are checked beginning from the node determined in step 70 in a direction toward an output thereof to find a first node assigned with a level so as to determine a level of the node which is selected in step 71 through a computation based on the level of a node having an input arc from the first node assigned with a level. Or, the node is assigned with a level 1 or 0.

After a level is assigned to at least a node in the processing 71, the processing 64 is re-executed.

Finally, in a maximum level setting step 72, assuming the maximum level of the nodes assigned with the levels to be N, the levels of all output ports are set to N+1, thereby terminating the processing.

Incidentally, in the processing steps 64 to 71, for simplification, a latch pair may be assumed to be a node for the processing.

Figure 9:
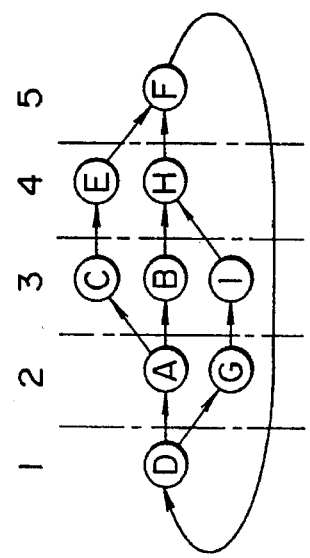
FIG. 9 is an explanatory diagram useful to explain an example of a net diagram assigned with levels.

In the method of assigning levels to nodes of a net diagram according to the present invention, the levels of nodes of the example of FIG. 7 are assigned as shown in FIG. 9. As can be also easily seen from this example, according to the level assigning method of the present invention, the number of feedback arcs is decreased, which improves the visibility of the diagram and the understandability of the signal flows. In other words, the example of FIG. 7 includes three loops and hence there are generated three feedback arcs in the worst case; however, as can be seen from the result of FIG. 9, only a feedback arc F→D is used and hence the signal flows from the left to the right, which facilitates understanding of the signal flows in the obtained circuit diagram.

Incidentally, in the example of FIG. 6, although the loop detection 62 and the latch recognition 63 are disposed as two separate steps, these operations may be executed in a single step. Moreover, although these processing steps are consecutively achieved in the starting portion of the processing procedure, even if these operations are placed before the processing 66 or 67, there does not occur any particular problem.

Determination of Reference Level Position

Figure 10:
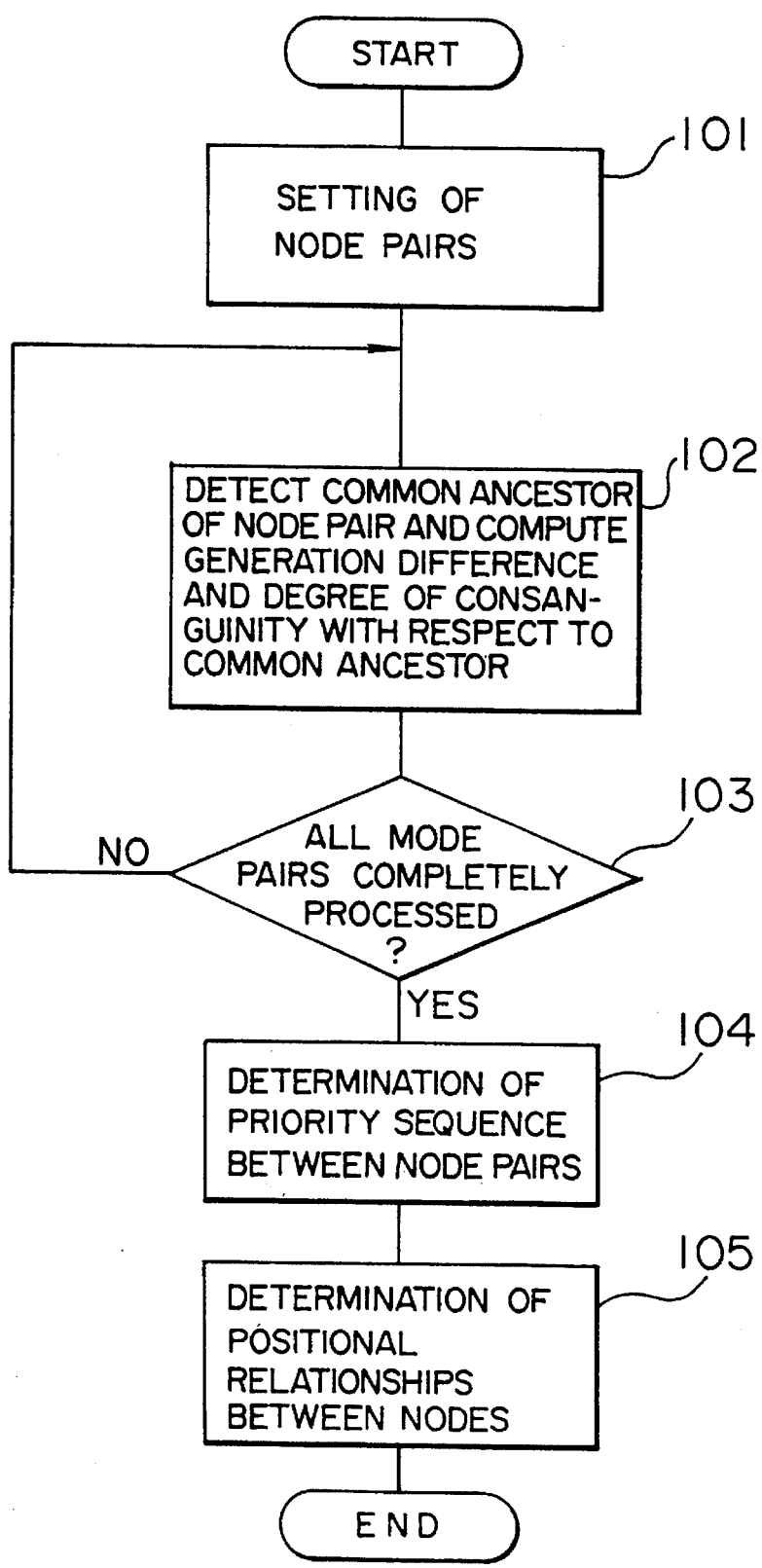
FIG. 10 is a flowchart showing an example of processing to determine a reference level position.

Referring now to FIG. 10, a description will be given of a method of determining a node position of a net diagram according to the present invention.

FIG. 10 shows a flowchart including processing steps 101 to 105 as an example of a detailed processing procedure of the reference level position determination 12. The respective processing steps will be specifically described in the following paragraphs.

The processing 101 is disposed to set node pairs each including two nodes at the reference level (output ports in this embodiment) without duplication therebetween. For example, in an example of FIG. 11, the reference level is assigned to the nodes A, B, C, and D, and hence six pairs are established as A-B, A-C, A-D, B-C, B-D, and C-D.

Incidentally, in this embodiment, only the output ports are set as the nodes at the reference level for simplification; however, any cases in which positional relationships are to be determined between nodes including elements and circuit parts other than the output ports may also be easily inferred from the description.

In the processing 102, the node pairs set in the step 101 are checked to detect an ancestor common to the node pairs as follows so as to compute a level difference (generation difference) between each pair and the common ancestor and a degree of consanguinity thereof.

As a method of detecting the common ancestor, the detection is achieved by assigning a higher priority to a node having a smaller level difference with respect to the node pair or to a node having the smaller sum of the number of arcs drawn from two nodes thereof. In addition, the degree of consanguinity of two nodes indicates the minimum value of the total number of arcs existing in the paths from the respective nodes to the common ancestor.

By the way, for a node pair for which a common ancestor is not detected, control is passed to the subsequent processing without executing the computations of the level difference and the degree of consanguinity with respect to the common ancestor.

In the processing step 103, the system checks to determine whether or not all node pairs established in the step 101 have been processed in the step 102. If any node pair remains unprocessed, the processing 102 is conducted for the node pair; otherwise, the processing step 104 is executed.

In the step 104, based on the computation results of the processing step 102, namely, the level difference and the degree of consanguinity of each node pair with respect to the common ancestor, the priority sequence is determined between node pairs. More specifically, a node pair having the smaller level difference with respect to the common ancestor takes precedence. Furthermore, a node pair having the smaller degree of consanguinity is assigned with the higher priority in the processing. For example, in the example of FIG. 11, the priority sequence is determined as shown in FIG. 12. That is, the priority sequence is set in an order of pairs A-C, B-C, A-B, B-D, A-D, and C-D.

Finally, in the processing step 105, according to the priority sequence obtained in the preceding step 104, the positional relationships between nodes at the reference level are determined such that a node pair having the higher priority is assigned with the nearer positional relationship, thereby terminating the processing.

For example, in the example of FIG. 11, the priority sequence of the node pairs is set as shown in FIG. 12. In consequence, by sequentially linking the node pairs beginning from the node pair which has the order of priority, the positional relationships can be decided. More concretely, based on the pair A-C, C is placed next to A; thereafter, from the pair B-C, B is located next to C. Next, if B is positioned next to A, a loop is formed. To avoid the condition of the loop, the pair A-B is not used such that based on the pair B-D, D is placed next to B. As a result, as shown in FIG. 13, the positional relationships between the nodes A to D are determined. In this example, in order to obtain the positional relationships, three pairs A-C, C-B, and B-D are employed; however, even if the pair A-B is adopted in place of the pair C-B, only the positions of A and C are exchanged in the result as compared with that shown in FIG. 13. Namely, with respect to the visibility of the diagram, there does not occur any problem. Furthermore, the order of A to D of FIG. 13 may be reversed. Also in this case, no problem occurs in this regard. Actually, the order is to be determined depending on the other factors (for example, a meaning of a signal on an output port).

In the method of determining positions of nodes or elements according to the present invention, as shown in FIG. 13, it is possible to minimize routing intersections in the proximity of the reference level. This unnecessitates the correction of placement or placement in the neighborhood of the output port of the logic circuit diagram after the placement is completed.

In the examples above, the level difference with respect to the common ancestor takes precedence over the degree of consanguinity; however, a case where the consanguinity takes precedence over the level difference may also be easily analogized and hence a description thereof will be omitted.

Relative Placement at Each Level

Figure 14:
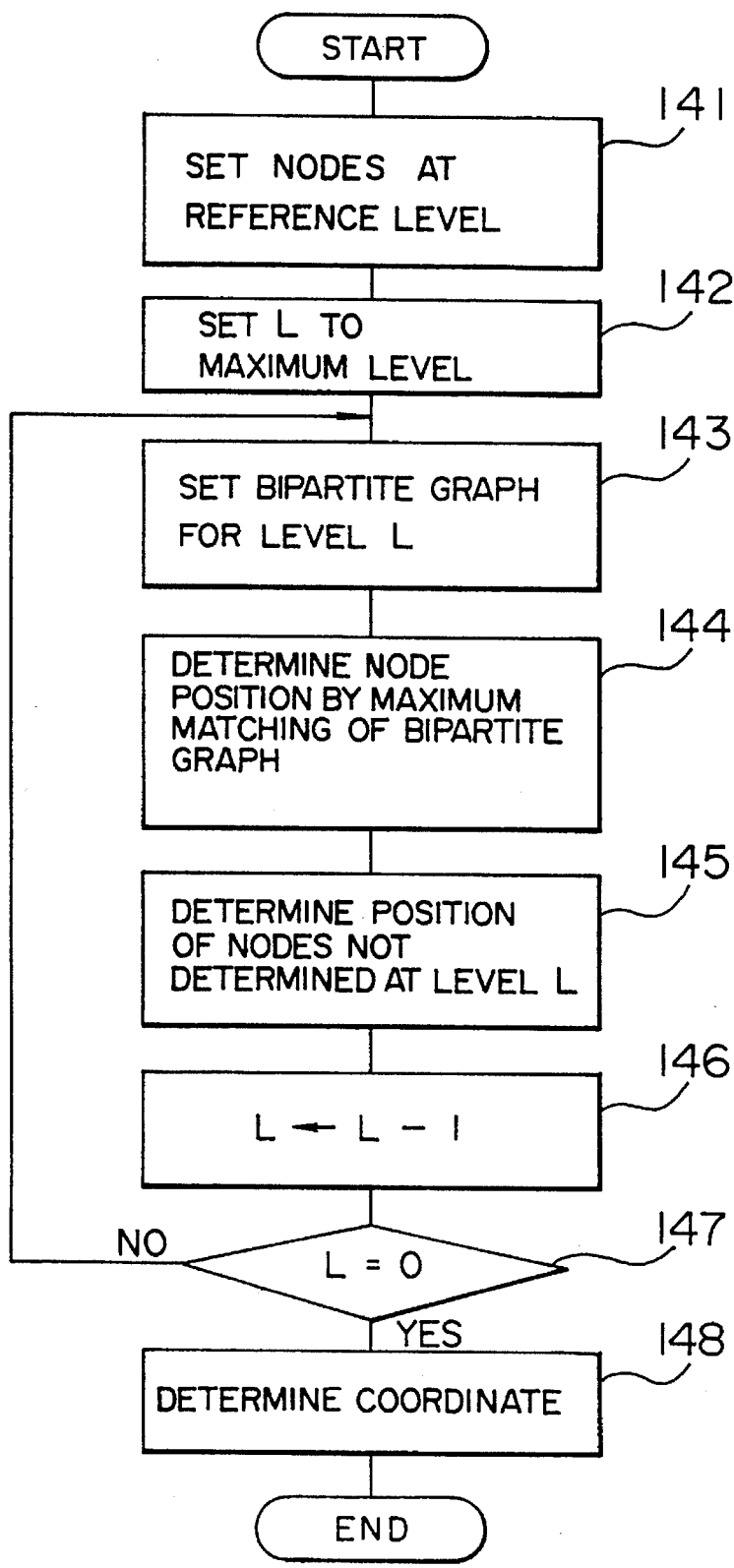
FIG. 14 is a flowchart showing an example of a relative placement processing of each level pair.

Referring now to FIG. 14, a description will be given of an placement method of a net diagram according to the present invention.

FIG. 14 is a flowchart including processing steps 141 to 148 as an example of a detailed processing procedure executed in the relative placement at each level 13. First, prior to a concrete description of the respective processing, a data structure of positional relationship information employed in these processing steps will be described.

Figure 15:
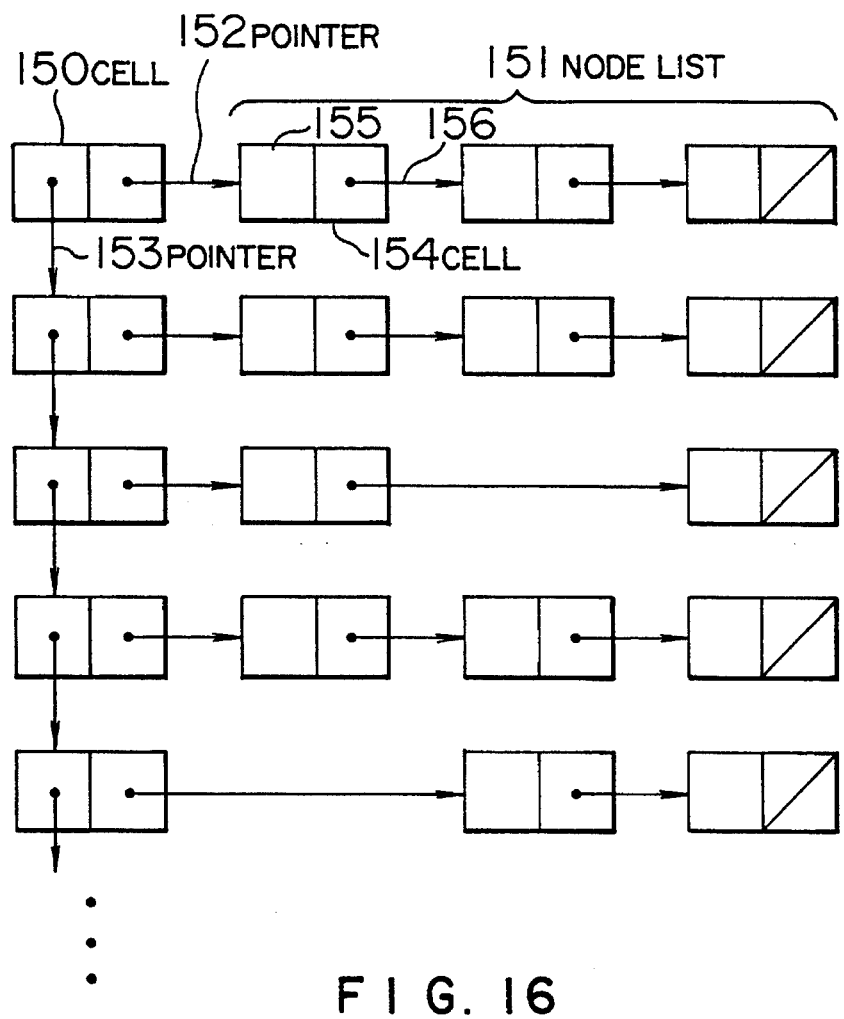
FIG. 15 is an explanatory diagram useful to explain an example of a data structure keeping positional relationship information of nodes.

FIG. 15 shows a data structure of information representing positional relationships between the respective nodes. In this data structure, a plurality of node lists 151 are linked by means of cells 150 representing sequential relationships between the lists 151. Moreover, the cell 150 comprises a pointer 153 indicating a sequence associated with lists and a pointer 152 denoting a sequence of node lists. In addition, a cell 154 constituting the node lists includes a pointer designating a node name or a node and a pointer 156 indicating the remaining portion of the list 151.

Referring next to the data structure of FIG. 15, description will be given of the respective processing.

Figure 16:
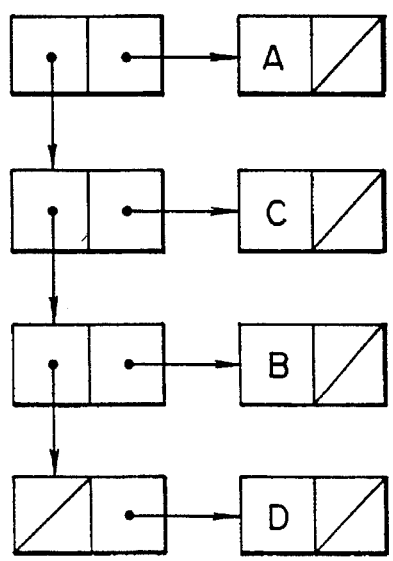
FIGS. 16, 19, and 20 are explanatory diagrams useful to explain example of positional relationship information of nodes.

In the setting of nodes at maximum level 141, the positional relationships of the nodes at the reference level (namely, the output ports) determined at the reference level position are stored in the first positions of the respective node lists in the data structure of FIG. 15 so as to preserve the positional relationships. For example, in the example of FIG. 13, the positional relationship information is stored in a form of FIG. 16.

Subsequently, in the processing 142, the maximum level (namely, the level of the output port) is set to the level counter L.

In the next step 143, a bipartite graph is produced for the level L. More specifically, based on the respective node lists in the positional relationship information of FIG. 15, the system checks the final nodes (stored in the right-most portions in FIG. 15) to obtain nodes assigned with levels not less than the level L. These nodes constitute a set (to be called a relative position determined set). Furthermore, according to the linking or connective relationships of the net list, a sum-set (to be called a relative position undetermined set) is produced between a set of the nodes outputting input arcs to the nodes of the relative position determined set and a set of the nodes at a level L–1. In other words, the system generates bipartite graphs associated with the relative position determined and undetermined sets and the arc (connective) relationships therebetween. The graph is to be used in the subsequent step 144.

In the step 144, a pair of nodes associated with each other is determined through the maximum matching effected on the bipartite graph obtained in the step 143 so as to allocate the nodes at the same relative position. The bipartite graph and the maximum matching thereof are described, for example, in "Excercise of Graph Theory: Fundamentals and Applications" written by Masao Iri and published from Corona Inc. in 1983.

Figure 17:
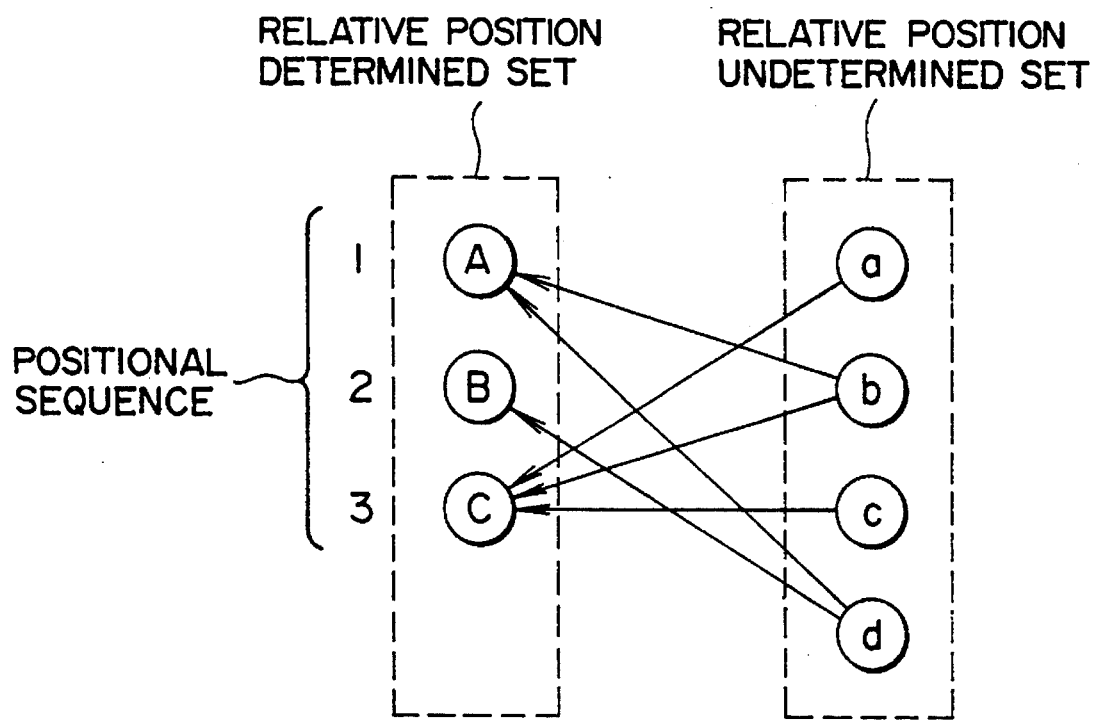
FIG. 17 is an explanatory diagram useful to explain a bipartite graph.
Figure 18:
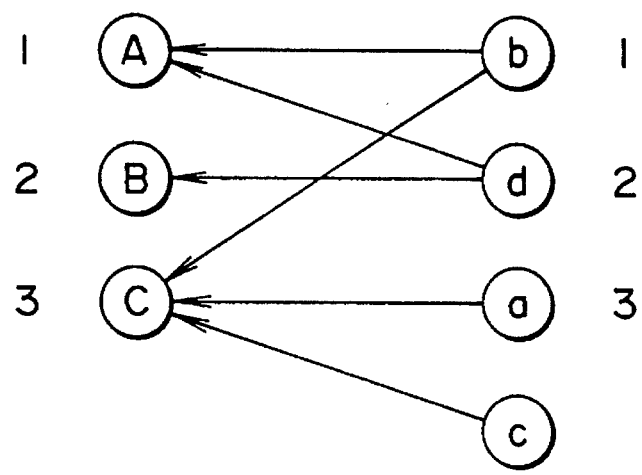
FIG. 18 is an explanatory diagram useful to explain the maximum matching of the bipartite graph.
Figure 19:
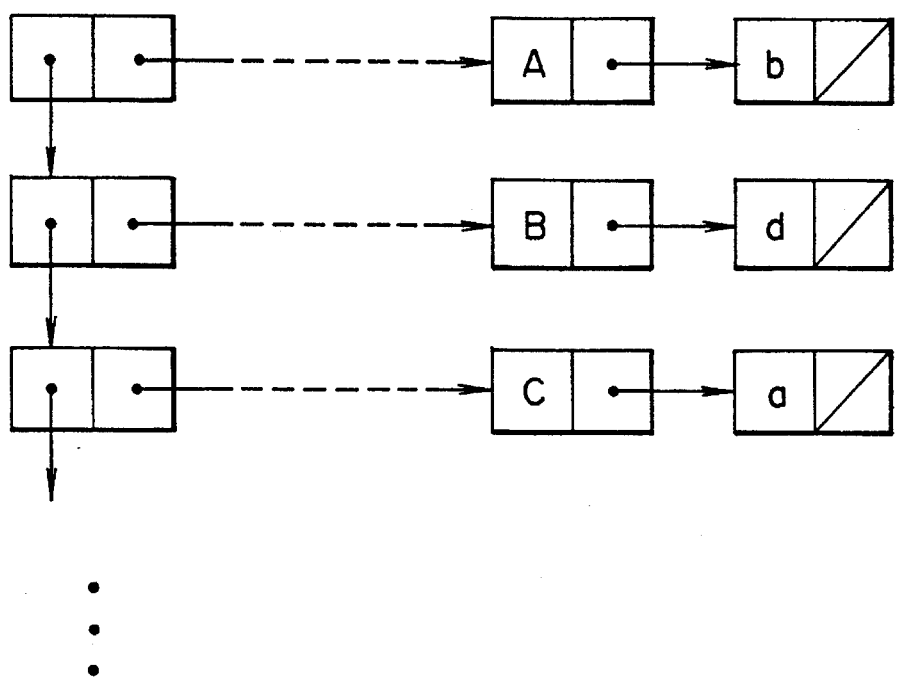

For example, when the processing step 144 is effected on an example of the bipartite graph of FIG. 17, a matching (correspondence) state occurs between the nodes A and b, B and d, and C and a as shown in FIG. 18, thereby establishing the maximum matching. In consequence, the same relative locations are assigned to the pairs of nodes A and b, B and d, and C and a. In consequence, the positional relationship information is obtained as shown in FIG. 19.

In this connection, when a plurality of maximum matchings take place, a matching having the larger level difference between the nodes thereof takes precedence over the other matchings. For example, under the condition of FIG. 18, two kinds of maximum matching are found as the matching of the nodes A and b, B and d, and C and a and that of nodes A and b, B and d, and C and c. In this situation, if the level difference between the nodes C and a is greater than that between the node C and c, the maximum matching of the nodes A and b, B and d, and C and a is preferentially selected.

As a result of determination of placements based on the maximum matching of bipartite graph as described above, the increase of links between nodes are established with links like direct lines (along the horizontal direction), which facilitates understanding of the connective relationships and signal flows in the diagram.

Furthermore, in the processing 145, a relative position is determined for any node at the level L−1 for previous step 144. That is, each node at the level L−1 selected from the relative position undetermined set excluding the nodes assigned with the relative positions in the processing 144 is located at a position of a center of gravity with respect to each relative position of the relative position determined nodes having an arc relationship with said each node or at a position in the neighborhood of the center of gravity.

Figure 20:
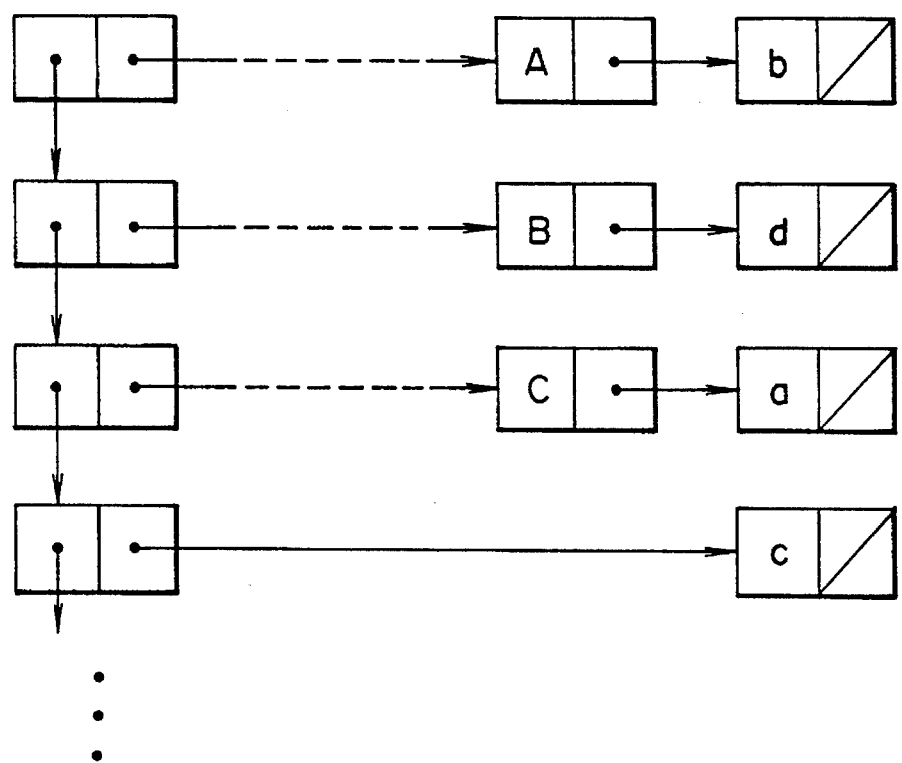

For example, since the desired center of gravity of node c and position of node a are assigned with an identical relative position in the example of FIG. 18, the pertinent node c need only be positioned between the nodes d and a or below the node a. In this case, since the node c is placed below the node a, the positional relationship information becomes that shown in FIG. 20.

In the processing 146, in order to achieve similar processing on the nodes at the level L−1, the content of the level counter L is decremented by one.

The judge processing 147 determines whether or not the level counter L contain a count 0. If this is the case, the processing step 148 is executed; otherwise, the processing steps 143 to 145 are repeatedly executed for the next level.

Finally, the processing 148 determines for each node, based on the positional relationship information stored in the data structure of FIG. 15, a level and a coordinate of the node in the vertical direction. For example, in the case of FIG. 20, the coordinates 1, 2, 3, and 4 are assigned to the nodes A and b, B and d, C and a, and the node c, respectively.

With the provision of the reference level position determination 12 and the relative placement at each level 13 in the embodiment according to the present invention, it is possible to create a logic circuit diagram which facilitates understanding of the overall connective relationships and which enhances visibility thereof. In consequence, the placement or placement need not be corrected after the placement is once achieved and hence the efficiency of the processing is increased.

Fine Adjustment of Element Placement

A detailed description will now be given of the fine adjustment of element placement 14. In this processing, based on the positional relationships determined by the coordinates (namely, global coordinates) of the respective placement elements and the contour information stored in the contour information file 2, signals are allocated to pins of the placement elements (nodes) and precise positions of the elements are determined. However, for simplification, in this description, it is assumed that the respective placement elements of a logic circuit diagram are each located to face toward a direction from the left to the right (namely, the rotary angle is zero).

Figure 21:
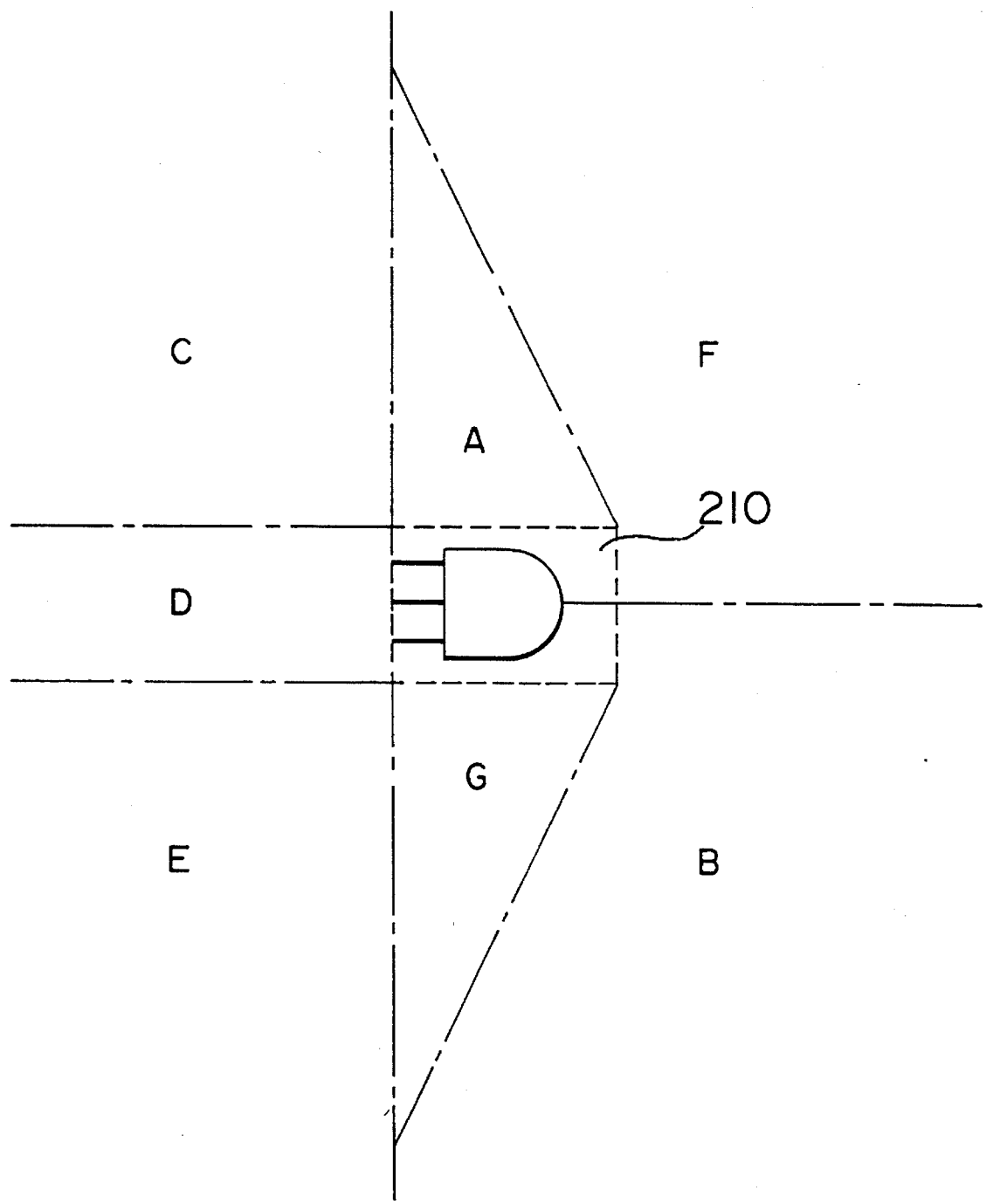
FIG. 21 is an explanatory diagram useful to explain a pin placement of the elements.

First, a description will be given of a method of allocating signals to the pins. FIG. 21 is a diagram including an placement element 210 at the center thereof in which start point element positions of input signal lines to the element 210 are associated with seven subregions. Regions A and G have a global first coordinate (a coordinate in the horizontal direction in this example) of the element 210. Region D possesses a global second coordinate (a coordinate in the vertical direction in this example) of the element 210.

Figure 22:
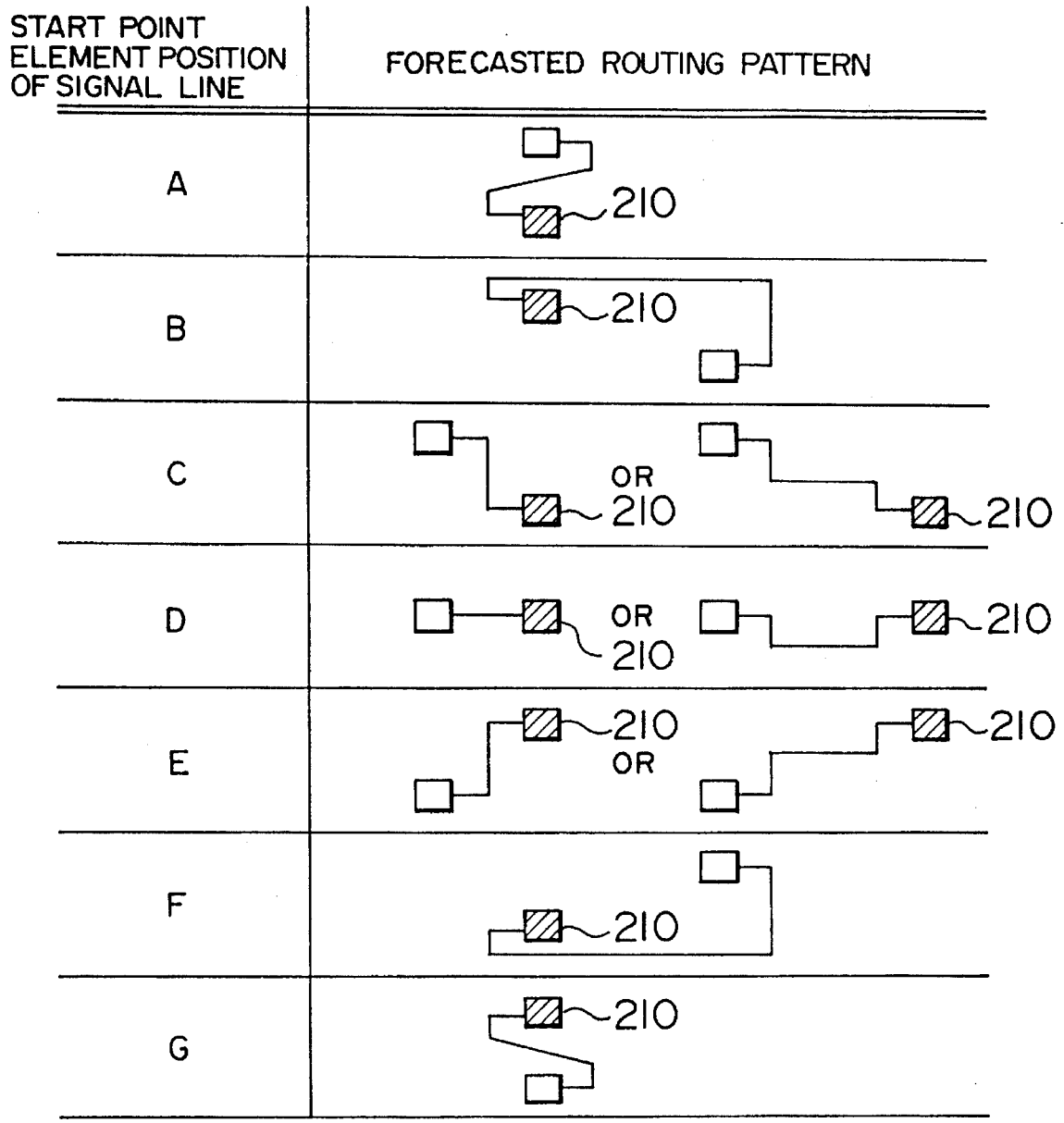
FIG. 22 is an explanatory diagram useful to explain relationships between placement elements and routing patterns.

When the area subdivision is achieved as shown in FIG. 21, routing patterns of the signal lines from the placement elements in the respective regions are forecasted as shown in FIG. 22. As can be easily recognized from the routing patterns of FIG. 22, in order to minimize routing intersections, a signal line of which the start point placement element is in the upper field in FIG. 22 is assigned to an upper input pin of the placement element 210 in this embodiment. That is, a signal line is assigned with a higher priority according to the region of the associated start placement element in the following order, namely, region A>region B, region B>region C, region C>region D, region D>region E, region E>region F, and region F>region G. According to this order with respect to the associated start point placement element, the pertinent signal line is allocated to an input pin of the element 210 at the upper position in FIG. 21.

Incidentally, the pin placement is achieved only for a logically equivalent pin. Moreover, only the pin placement is conducted in this example; however, by combining a rotation and a mirror inversion of placement elements, it is possible to wire the elements with a reduced number of intersections.

In addition, also in each region, the pin placement priority sequence may also be determined depending on routing patterns forecasted based on the positions of the start point placement elements. For example, the region D is related to the routing patterns as shown in FIG. 22, and a signal line associated with a start point placement element with the larger value of the global first coordinate (a coordinate in the horizontal direction) need only be allocated to an input pin at the upper location of the placement element 210.

Next, a description will be given of the operation to determine precise coordinates of the respective placement elements.

Since input/output pin locations vary depending on the contour of each element to be allocated, when only the global coordinate is used for the determination, even if the global second coordinates of two elements are identical to each other, a routing route therebetween is not necessarily drawn as a direct line. To overcome this difficulty, according to this embodiment, a local second coordinate is determined for each placement element such that for the adjacent elements associated with the same global second coordinate, a position of an output pin of one of the adjacent placement elements and a position of an input pin of the other one thereof to be connected to the output pin are assigned with an identical second coordinate (a coordinate in the vertical direction), so that the routing therebetween becomes a direct line. For example, as shown in FIG. 23, if the placement of the elements is accomplished only based on the global coordinate, a positional discrepancy takes place between the input and output pins, which causes the routing therebetween to include a bending portion. To avoid this disadvantage, the local coordinates are set so as to prevent the positional difference from appearing between the input and output pins to allocate the elements with the local coordinates also taken into consideration, thereby producing a circuit diagram with a satisfactory visibility.

By the way, although only the second coordinate has been described in this example, it is also possible to similarly set the local coordinate for the first coordinate so as to conduct a fine adjustment.

Routing at Each Level

Figure 24:
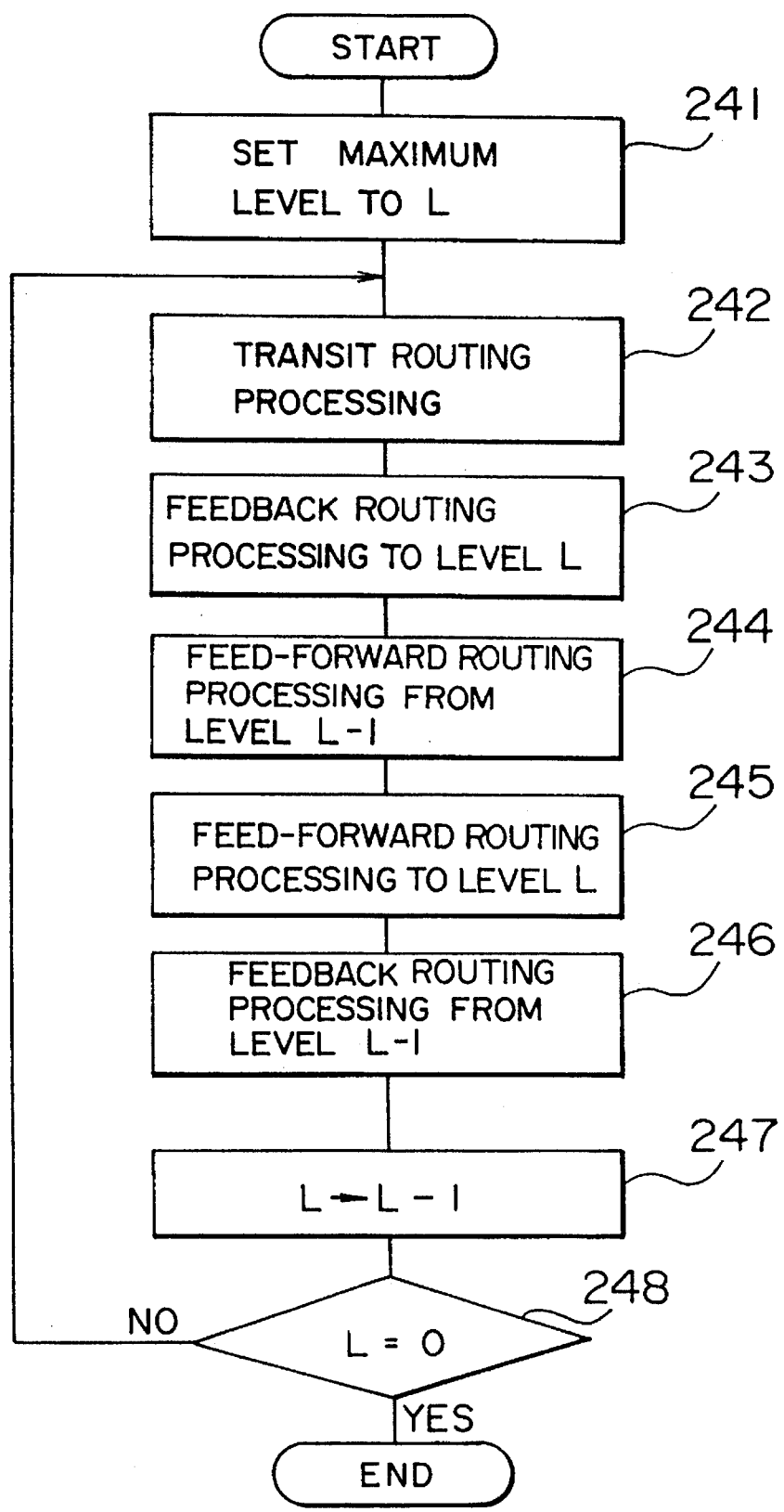
FIG. 24 is a flowchart showing an example of a routing processing at each level.

A method of routing a network according to the present invention will be next described by referring to FIG. 24.

FIG. 24 is a flowchart including steps 241 to 248 showing an example of the processing procedure of the routing at each level 15. First, in the step 241, the maximum level (the level of the output port) is assigned to the level counter L. Next, in the processing steps 242 to 246, routings are conducted for the regions at the level L (namely, the global first coordinate L). In this routing operation, the net list, position coordinates of the respective placement elements and pins thereof, and connective information of routings between the levels L+1 and L are referenced to produce coordinates of the start, bending, and end points of each routing and the connective information of routings between the levels L and L−1. In addition, when the L-level routing operation is completed, the processing step 247 decrements the level counter L by one. Then, the judge processing 248 judges to determine whether or not the content of the level counter L is 0. If L is not 0, control returns to the step 242 to repeatedly execute the routing steps 242 to 246 for the next level. If L is 0, the routing processing at each level 15 is thereby completed.

Next, a description will be given in detail of the L-level routing processing steps 242 to 246.

Figure 25:
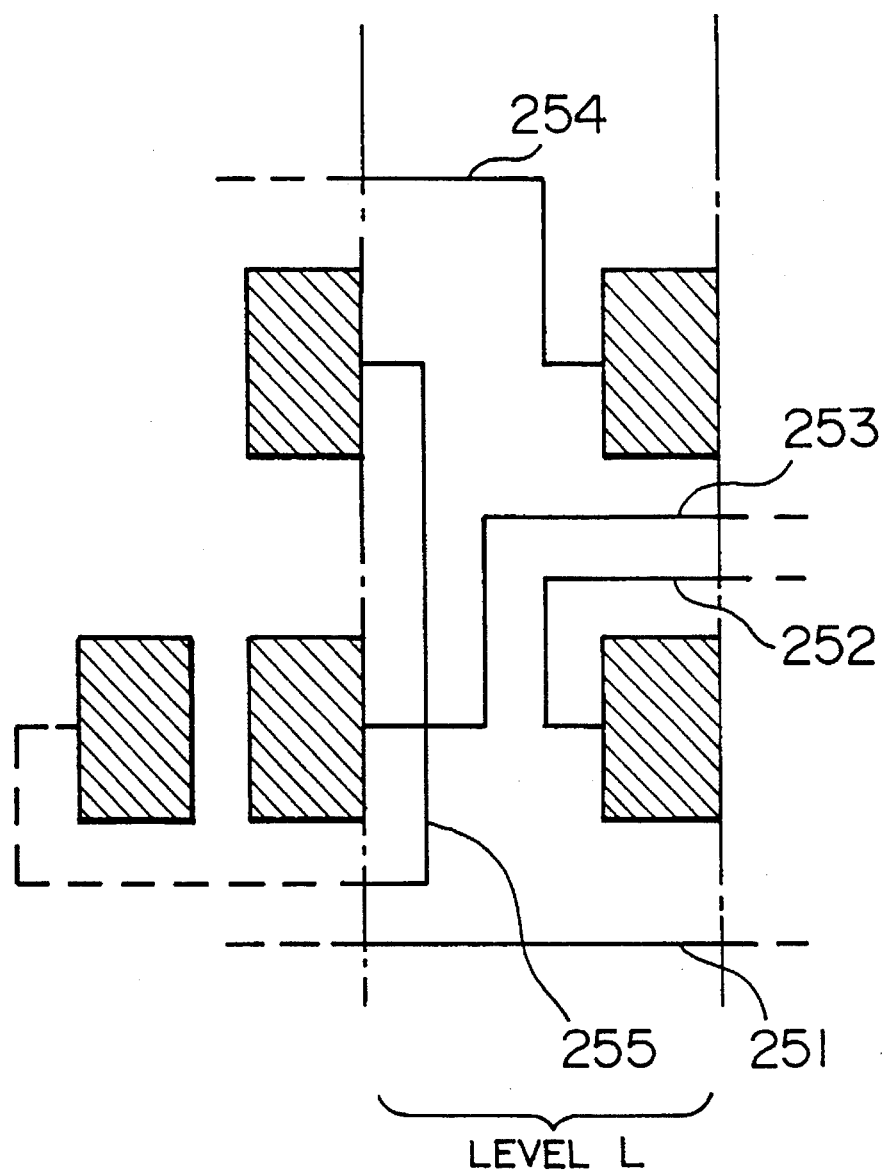
FIG. 25 is an explanatory diagram useful to explain kinds of routings.

FIG. 25 is a net diagram showing routing types of regions at the respective levels. A routing 251 passes from a region at the level L+1 to a region at the level L−1. A routing 252 is a feedback routing from a region of the level L+1 to a placement element at the level L. A routing 253 is a feed-forward routing from a placement element at the L−1 level to a region at the level L+1. A routing 254 is a feed-forward routing to a placement element at the level L. A routing 255 is drawn from a placement element at the level L−1 to a region at the level L−1.

In this embodiment, a routing order is determined for each routing type of FIG. 25 so as to determine the routing according to the routing order. More specifically, as shown in FIG. 24, in the transit routing processing 242, routings of the type indicated by the routing 251 are conducted. In the feedback routing processing to level L 243, routings of the type associated with the routing 252 are accomplished. In the feed-forward routing processing from level L−1 244, routings of the kind related to the routing 253 are carried out. In the feed-forward routing processing to level L 245, routings of the kind of the routing 254 are achieved. In the feedback routing operation 246 from level L−1 246, routings of the type associated with the routing 255 are conducted. In this routing sequence, a routing with the earlier routing sequence is achieved in the nearer position of an placement element at the level L. However, although it may be considered that the processing sequence of the routing steps 244 and 245 of this embodiment is reversed, for simplicity, a description of such a case will be omitted.

Figure 26:
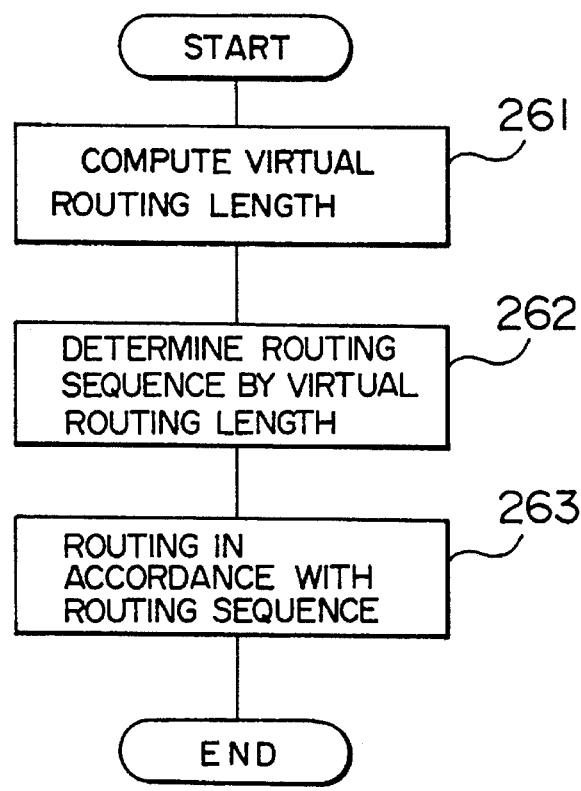
FIG. 26 is a flowchart showing an example of a routing processing for each routing kind.

In addition, the respective routing steps 242 to 246 conduct processing as shown in FIG. 26.

FIG. 26 shows a flowchart including steps 261 to 263 showing an example of a detailed processing procedure of the routing processing 242 to 246.

In the flowchart, the step 261 is disposed to compute a virtual routing length of each routing line based on a vertical component of length in the routing operation. In the processing 262, the routings are sorted according to the virtual routing lengths to determine a routing sequence. Furthermore, in the step 263, depending on the routing sequence, the routing is conducted from the side of routing elements at the level L without allowing any overlapping between the routings. By the way, in a region of the level L, for a routing which has no bending portion, the steps 261 and 262 are skipped so as to preferentially achieve the routing.

In this connection, according to this embodiment, for simplicity, the virtual routing length is in principle set to be equal to the vertical component of length in the routing operation. However, for the routing kinds of the routings 253 and 254, if the upper end of the vertical component of the routing is bent toward the level L−1, the upper end is assumed to have a sufficiently large coordinate (for example, the coordinate of the upper-most position of the diagram) so as to compute the virtual routing length. Conversely, if the lower end of the vertical component of the routing is bent toward the level L−1, the lower end is assumed to have a sufficiently small coordinate (for example, the coordinate of the lower-most position of the diagram) so as to compute the virtual routing length.

Figure 27:
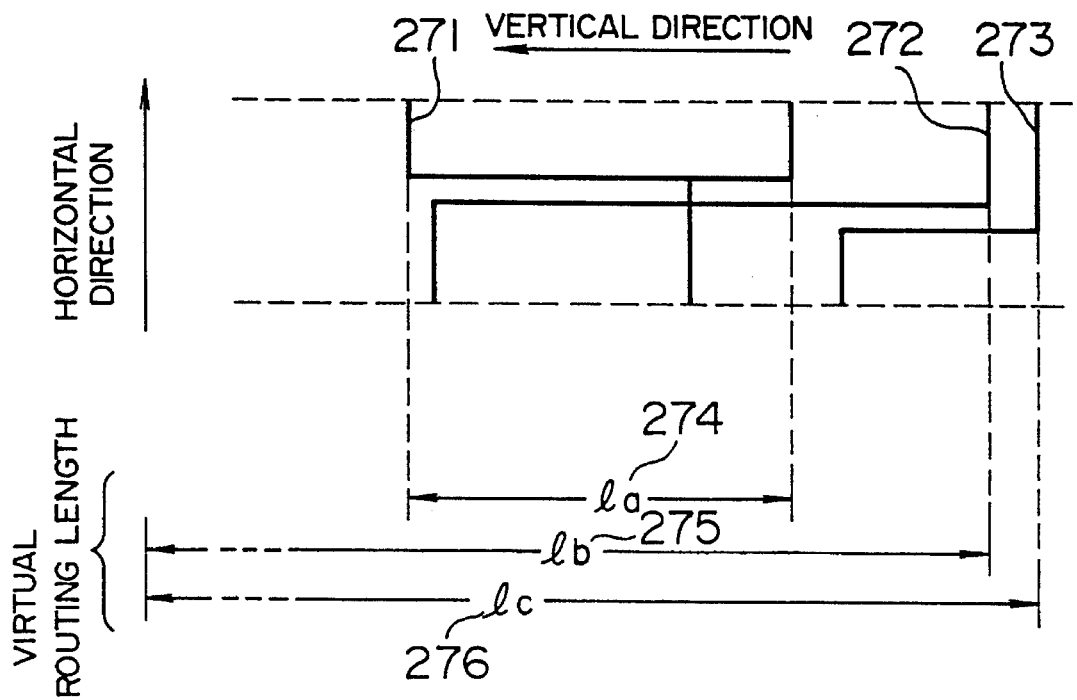
FIG. 27 is an explanatory diagram useful to explain a virtual routing length.

For example, as shown in FIG. 27, the virtual routing length of the routings 271 to 273 are determined as $l_a$ 274, $l_b$ 275, and $l_c$ 276, respectively. Furthermore, in this embodiment, the step 262 conducts the sorting operation in the ascending order in the routing steps 243 to 245 and in the descending order in the routing step 246.

In the routing operation described above, for simplicity, the description has been given of a case where a routing with the earlier routing sequence is effected at the nearer placement element at the level L. The reverse case may also be easily inferred from the description.

With provisions of the pin placement in the fine adjustment of element placement 14 and the routing processing at each level 15 according to the embodiment, it is possible to produce through a simple processing a logic circuit diagram having a reduced number of routing intersections. In consequence, once the routing operation is completed, it is not necessary to correct the routing results, which improve the efficiency of the routing processing.

According to the schematic generator to automatically produce a logic circuit diagram, it is possible to automatically generate a logic circuit diagram in which the feedback signal lines are reduced, direct line signal lines are increased, and the number of bending portions and intersections of signal lines are respectively minimized, thereby improving the understandability of the logic functions. Furthermore, in the schematic generator, only one process of placement and routing is required, namely, neither the placement correction nor the routing correction is necessitated, which enables an efficient placement and routing processing to be achieved. In addition, since the contour information file keeps physical information related to the placement elements, there is developed an effect that any changes, for example, of the technology of the objective circuit may be easily coped with.

As described above, according to the present invention, the node level assignment can be conducted with a reduced number of feedback arcs, and positional relationships of nodes at the reference level are appropriately determined. Based on the positional relationships, the nodes can be placed on connective relationships, which can be easily traced. Moreover, taking the routing sequence and the virtual routing lengths into consideration, the number of routing intersections can be reduced. Consequently, there is obtained an advantageous effect that a net diagram or a logic circuit diagram is produced with an improved visibility of connective relationships and with an increased understandability of the content expressed in the diagram.

In addition, physical information of the placement elements is kept in the contour information file so as to be separated from the placement processing, which leads to an excellent effect that the system can easily cope with changes in the utilization purpose of the net diagram and in characteristics and technologies of the objective circuit.

While particular embodiments of the invention have been shown and described, it will be obvious to those skilled in the art that various changes and modifications may be made without departing from the present invention in its broader aspects.

I claim:

1. A method of assigning a level to a node of a net diagram, said method comprising:
   (a) detecting loops formed by nodes and arcs in a net diagram;
   (b) detecting locations at which a maximum overlapping of the loops detected in step (a) exists, each of said locations comprising at least one arc by which at least two nodes are serially connected to one another;
   (c) determining a feedback arc among the locations detected in step (b), said feedback arc including a disconnection node constituting an end-point node of said feedback arc; and
   (d) assigning a level to said disconnection node.

2. A method as in claim 1, wherein in steps (b) and (c), when a plurality of maximum overlapping locations exist, at least one of the following selection rules is employed to determine the feedback arc:
   (a) a first selection rule comprising selecting a particular arc with respect to which a particular node receiving the particular arc has a minimum number of level-unassigned nodes which are start point nodes of input arcs to the particular node;
   (b) a second selection rule comprising selecting a particular arc with respect to which a particular node receiving the particular arc has a maximum number of level-assigned nodes which are start point nodes of input arcs to the particular node; and
   (c) a third selection rule comprising selecting a particular arc with respect to which a particular node receiving the particular arc has a minimum value of a maximum level among level-assigned nodes which are start point nodes of input arcs to the particular node.

3. The method as in claim 1 or 2, further comprising extracting a latch pair from said loops detected in step (a), said latch pair comprising only two nodes and two arcs connecting said two nodes, and assigning said two nodes a same level.

4. A method of assigning levels to nodes of a net diagram, said method comprising:
   (a) detecting loops formed by nodes and arcs in a net diagram;
   (b) assigning a base level to ones of said nodes which have no inputting arc thereto;
   (c) assigning a next level to each node with respect to which all nodes of input arcs thereto are level-assigned nodes, said next level being one level higher than a maximum level assigned to said level-assigned nodes;
   (d) if all nodes have not yet been assigned with a level in steps (b) and (c), detecting locations at which a maximum overlapping of the loops detected in step (a) exists, each of said locations comprising at least one arc by which at least two nodes are serially connected to one another;
   (e) determining a feedback arc among the locations detected in step (d), said feedback arc including a disconnection node constituting an end point node of said feedback arc;
   (f) assigning a level to said disconnection node;
   (g) thereafter repeating steps (b) and (c) until all nodes except output nodes have been assigned with a level; and
   (h) assigning a level N+1 to all output nodes, where N is a maximum level assigned to any of said nodes in steps (b) through (g).

5. A method as in claim 4, wherein step (f) comprises assigning a level M+1 to said disconnection node where already-level assigned start point nodes of input arcs thereto have a maximum already-assigned level M, or, where all start point nodes of input arcs to said disconnection node are non-level-assigned, locating a first level-assigned node on an output side of the disconnection node, determining a number of levels by which the disconnection node is separated from said first node and assigning a level to said disconnection node constituting a level of said first node less said number.

6. A placement method for determining positional relationships for nodes of a net diagram, said nodes having levels assigned thereto, in a direction orthogonal to a direction of said levels, said method comprising:
   (a) providing a graph comprising a first set of said nodes for which positional relationships have been determined, a second set of said nodes for which positional relationships have not been determined, and connective relationships between said first set and said second set;
   (b) determining a maximum matching between nodes in said first set and said second set;
   (c) assigning identical relative locations to matching pairs of nodes identified in step (b) as part of said maximum matching; and
   (d) with respect to a given node in said second set which is not selected in step (b) as part of a matching pair, determining a positional location thereof based on one of a direct or an indirect connective relationship with one of said nodes of said first set.

7. The method as in claim 6, wherein when it is determined in step (b) that a plurality of maximum matchings exists, one of said plurality of maximum matchings is selected which has a largest level difference between matching pairs of nodes contained therein.

8. A placement method for determining nodes positioned in a network, said method comprising:
   (a) determining all possible node pairs among said plurality of nodes;
   (b) detecting one of a common ancestor node and a common descendent node for each of said node pairs;
   (c) determining a total number of arcs from each node of said node pairs to said common ancestor node or said common descendent node;
   (d) determining a level difference between each node of said node pairs and said common ancestor node or said common descendant node;
   (e) establishing a priority sequence among said node pairs, said priority sequence comprising assigning a higher priority to one of said node pairs having one of a smaller value of said total number of arcs determined in step (c) and a smaller maximum value of said level difference detected in step (d); and
   (f) determining relative positions of said plurality of nodes in a hierarchy determined by said priority assigned in step (e).

9. A schematic generating method, comprising:
(a) assigning levels to nodes of a net diagram by:
  (i) detecting loops formed by nodes and arcs in a net diagram;
  (ii) assigning a base level to ones of said nodes which have no inputting arc thereto;
  (iii) assigning a next level to each node with respect to which all nodes of input arcs thereto are level-assigned nodes, said next level being one level higher than a maximum level assigned to said level-assigned nodes;
  (iv) if all nodes have not yet been assigned with a level in steps (a)(ii) and (a)(iii), detecting locations at which a maximum overlapping of the loops detected in step (a)(i) exists, each of said locations comprising at least one arc by which at least two nodes are serially connected to one another;
  (v) determining a feedback arc among the locations detected in step (iv), said feedback arc including a disconnection node constituting an end point node of said feedback arc;
  (vi) assigning a level to said disconnection node;
  (vii) repeating steps (a)(ii) and (a)(iii) until all nodes except output nodes have been assigned with a level; and
  (viii) assigning a level N+1 to all output nodes, where N is a maximum level assigned to any of said nodes in steps (a)(ii) through (a)(vii);
(b) determining positional relationships of said nodes in said net diagram at a reference level by:
  (i) determining all possible node pairs among said plurality of nodes;
  (ii) detecting one of a common ancestor node and a common descendent node for each of said node pairs;
  (iii) determining a total number of arcs from each node of said node pairs to said common ancestor node or said common descendent node;
  (iv) determining a level difference between each node of said node pairs and said common ancestor node or said common descendant node;
  (v) establishing a priority sequence among said node pairs, said priority sequence comprising assigning a higher priority to one of said node pairs having one of a smaller value of said total number of arcs determined in step (b)(iii) and a smaller maximum value of said level difference detected in step (b)(iv); and
  (vi) determining relative positions of said plurality of nodes in a hierarchy determined by said priority assigned in step (b)(v);
(c) sequentially determining node positions of all said nodes by:
  (i) providing a graph comprising a first set of said nodes for which positional relationships have been determined, a second set of said nodes for which positional relationships have not been determined, and connective relationships between said first set and said second set;
  (ii) determining a maximum matching between nodes in said first set and said second set;
  (iii) assigning identical relative locations to matching pairs of nodes identified in step (c)(ii) as part of said maximum matching; and
  (iv) with respect to a given node in said second set which is not selected in step (c)(ii) as part of a matching pair, determining a positional location thereof based on one of a direct or an indirect connective relationship with one of said nodes of said first set.

10. A method as in claim 9, further comprising:
(d) determining a first global coordinate from each of said levels assigned to said nodes in step (a) and a second global coordinate, which is orthogonal to said first global coordinate, from each of said node positions determined in step (c);
(e) determining local coordinates of said nodes, orientations of placement elements corresponding to said nodes and pin position placements of said placement elements based upon said first and second global coordinates determined in step (d) and connective relationship information and contour information relating to said placement elements;
(f) routing connecting lines between said placement elements in accordance with said global coordinates and said local coordinates; and
(g) determining absolute coordinates of positions and routings of said placement elements based on said global coordinates and said local coordinates.

11. The method as in claim 10, wherein in steps (a)(iv) and (a)(v), when a plurality of maximum overlapping locations exist, at least one of the following selection rules is employed to determine the feedback arc:
(a) a first selection rule comprising selecting a particular arc with respect to which a particular node receiving the particular arc has a minimum number of level-unassigned nodes which are start point nodes of input arcs to the particular node;
(b) a second selection rule comprising selecting a particular arc with respect to which a particular node receiving the particular arc has a maximum number of level-assigned nodes which are start point nodes of input arcs to the particular node; and
(c) a third selection rule comprising selecting a particular arc with respect to which a particular node receiving the particular arc has a minimum value of a maximum level among level-assigned nodes which are start point nodes of input arcs to the particular node.

12. A method as in claim 10, wherein step (e) further comprises, for two adjacent nodes having identical second global coordinates, determining a local coordinate of said pin position placement of each of said two adjacent nodes to be identical to each other.

13. The method as in claim 9, wherein in steps (a)(iv) and (a)(v), when a plurality of maximum overlapping locations exist, at least one of the following selection rules is employed to determine the feedback arc:
(a) a first selection rule comprising selecting a particular arc with respect to which a particular node receiving the particular arc has a minimum number of level-unassigned nodes which are start point nodes of input arcs to the particular node;
(b) a second selection rule comprising selecting a particular arc with respect to which a particular node receiving the particular arc has a maximum number of level-assigned nodes which are start point nodes of input arcs to the particular node; and
(c) a third selection rule comprising selecting a particular arc with respect to which a particular node receiving the particular arc has a minimum value of a maximum level among level-assigned nodes which are start point nodes of input arcs to the particular node.

14. The method as in claim 9 or 10, wherein step (a)(vi) comprises assigning a level M+1 to said disconnection node where already-level assigned start point nodes of input arcs thereto have a maximum already-assigned level M, or, where all start point nodes of input arcs to said disconnection node are non-level-assigned, locating a first level-assigned node on an output side of the disconnection node, determining a number of levels by which the disconnection node is separated from said first node and assigning a level to said disconnection node constituting a level of said first node less said number.

15. The method as in claim 9 or 10, wherein when it is determined in step (c)(ii) that a plurality of maximum matchings exists, one of said plurality of maximum matchings is selected which has a largest level difference between matching pairs of nodes contained therein.

16. The method as in claim 9, further comprising:
    (d) determining a first global coordinate from each of said levels assigned to said nodes in step (a) and a second global coordinate, which is orthogonal to said first global coordinate, from each of said node positions determined in step (c);
    (e) routing connecting lines between said placement elements in accordance with said global coordinates; and
    (f) determining absolute coordinates of positions and routings of said placement elements based on said global coordinates.

17. The method as in claim 9, 10, 13 or 11 further comprising extracting a latch pair from said loops detected in step (a)(i), said latch pair comprising only two nodes and two arcs connecting said two nodes, and assigning said two nodes a same level.

18. A method of assigning levels to nodes of a net diagram, said method comprising:
    (a) detecting loops formed by nodes and arcs in a net diagram;
    (b) assigning a base level to ones of said nodes which have no inputting arc thereto;
    (c) assigning a next level to each node with respect to which all nodes of input arcs thereto are level-assigned nodes, said next level being one level higher than a maximum level assigned to said level-assigned nodes;
    (d) if all nodes have not yet been assigned with a level in steps (b) and (c), detecting locations at which a maximum overlapping of the loops detected in step (a) exists, each of said locations comprising at least one arc by which at least two nodes are serially connected to one another;
    (e) determining a feedback arc among the locations detected in step (d), said feedback arc including a disconnection node constituting an end point node of said feedback arc; and
    (f) thereafter, for nodes and arcs except feedback arcs, repeating steps (b), (c), (d) and (e) until all nodes have been assigned with a level.

19. A routing method for routing connecting lines between nodes of a network diagram by routing said connecting lines in at least one region between two adjacent columns or rows of said nodes, said method comprising, for a case of routing at least some of said connecting lines in a same region between said two adjacent columns or rows, the steps of:
    (a) determining, for each of a plurality of said connecting lines, a virtual routing length by measuring a length of said each of said plurality of said connecting lines in a direction of said same region between and parallel with said two adjacent columns or rows and from a position of a bending point from which said each of said plurality of said connecting lines bends to extend in a direction orthogonal to said direction of said region and if any one of said plurality of said connecting lines has no bending point, assigning a given virtual routing length thereto;
    (b) sorting said plurality of said connecting lines in accordance with their respective virtual routing lengths determined in step (a) to determine a routing sequence; and
    (c) routing said plurality of said connecting lines in said same region in accordance with said routing sequence determined in step (b).

20. A method as in claim 19, wherein step (b) comprises sorting said plurality of said connecting lines in said same region in order of their respective virtual routing lengths determined in step (a).

21. A routing method for sequentially routing connecting lines in a space between parallel linear arrays of adjacent columns or adjacent rows of nodes of a network diagram, said method comprising:
    (a) determining routing paths based upon positional relationships between start point nodes and end point nodes respectively associated with said connecting lines in said space;
    (b) determining routing patterns based on said positional relationships and sorting said routing patterns to establish a preset sequence of said routing patterns; and
    (c) performing a routing operation for said connecting lines in said space in accordance with said routing paths determined in step (a), in accordance with a sequence including:
        (i) determining for each of said connecting lines a virtual routing length from positions of bending points thereof and if any one of said connecting lines has no bending point, assigning a given virtual routing length thereto; and
        (ii) sorting and routing said connecting lines in said space in said routing paths in accordance with a sequence determined by said preset sequence of said routing patterns add said respective virtual routing lengths determined in step (i).

22. A method according to claim 21, wherein said routing of said connecting lines in step (b)(ii) comprises minimizing bending portions in said connecting lines.

23. A schematic generator for automatically generating a logic circuit, said generator comprising:
    (a) first means for inputting connective information relating to a logic circuit;
    (b) second means for storing information defining contours of placement elements in said logic circuit;
    (c) third means for storing information relating to placements and routings of said placement elements in said logic circuit;
    (d) fourth means for storing information relating to graphic symbols of said placement elements, said graphic symbol information preserving integrity with respect to said information stored in said second means;
    (e) fifth means for drawing a logic circuit diagram based upon said information input by said first means, said information stored in said third means, and said information stored in said fourth means; and
    (f) processing means for executing the steps of:

(1) assigning levels to nodes of a net diagram by:
  (i) detecting loops formed by nodes and arcs in a net diagram;
  (ii) assigning a base level to ones of said nodes which have no inputting arc thereto;
  (iii) assigning a next level to each node with respect to which all nodes of input arcs thereto are level-assigned nodes, said next level being one level higher than a maximum level assigned to said level-assigned nodes;
  (iv) if all nodes have not yet been assigned with a level in steps (ii) and (iii), detecting locations at which a maximum overlapping of the loops detected in step (i) exists, each of said locations comprising at least one arc by which at least two nodes are serially connected to one another;
  (v) determining a feedback arc among the locations detected in step (ii), said feedback arc including a disconnection node constituting an end point node of said feedback arc;
  (vi) assigning a level to said disconnection node;
  (vii) repeating steps (ii) and (iii) until all nodes except output nodes have been assigned with a level; and
  (viii) assigning a level N+1 to all output nodes, where N is a maximum level assigned to any of said nodes in steps (ii) through (vii);
(2) determining positional relationships of said nodes in said net diagram at a reference level by:
  (i) determining all possible node pairs among said plurality of nodes;
  (ii) detecting one of a common ancestor node and a common descendent node for each of said node pairs;
  (iii) determining a total number of arcs from each node of said node pairs to said common ancestor node or said common descendent node;
  (iv) determining a level difference between each node of said node pairs and said common ancestor node or said common descendant node;
  (v) establishing a priority sequence among said node pairs, said priority sequence comprising assigning a higher priority to one of said node pairs having one of a smaller value of said total number of arcs determined in step (2)(iii) and a smaller maximum value of said level difference detected in step (2)(iv); and
  (vi) determining relative positions of said plurality of nodes in a hierarchy determined by said priority assigned in step (2)(v);
(3) sequentially determining node positions of all said nodes by:
  (i) providing a graph comprising a first set of said nodes for which positional relationships have been determined, a second set of said nodes for which positional relationships have not been determined, and connective relationships between said first set and said second set;
  (ii) determining a maximum matching between nodes in said first set and said second set;
  (iii) assigning identical relative locations to matching pairs of nodes identified in step (3)(ii) as part of said maximum matching; and
  (iv) with respect to a given node in said second set which is not selected in step (3)(ii) as part of a matching pair, determining a positional location thereof based on one of a direct or an indirect connective relationship with one of said nodes of said first set; and (4) routing connecting lines between said nodes; and thereafter sequentially:
(5) determining a first global coordinate from each of said levels assigned to said nodes in step (1) and a second global coordinate, which is orthogonal to said first global coordinate, from each of said node positions determined in step (3);
(6) determining local coordinates of said nodes, orientations of placement elements corresponding to said nodes and pin position placements of said placement elements based upon said first and second global coordinates determined in step (5) and connective relationship information and contour information relating to said placement elements;
(7) routing connecting lines between said placement elements in accordance with said global coordinates and said local coordinates; and
(8) determining absolute coordinates of positions and routings of said placement elements based on said global coordinates and said local coordinates, so as to attain information associated with placements and routings of said logic circuit diagram for provision to said third means.

24. The generator as in claim 23, wherein in steps (f)(1)(iv) and (f)(1)(v), when a plurality of maximum overlapping locations exist, said processing means employs at least one of the following selection rules to determine the feedback arc:
  (a) a first selection rule comprising selecting a particular arc with respect to which a particular node receiving the particular arc has a minimum number of level-unassigned nodes which are start point nodes of input arcs to the particular node;
  (b) a second selection rule comprising selecting a particular arc with respect to which a particular node receiving the particular arc has a maximum number of level-assigned nodes which are start point nodes of input arcs to the particular node; and
  (c) a third selection rule comprising selecting a particular arc with respect to which a particular node receiving the particular arc has a minimum value of a maximum level among level-assigned nodes which are start point nodes of input arcs to the particular node.

25. The generator as in claim 23 or 24, further comprising means for extracting a latch pair from said loops detected in step (f)(1)(i), said latch pair comprising only two nodes and two arcs connecting said two nodes, and for assigning said two nodes a same level.

26. A generator according to claim 23, further comprising display means for displaying said logic diagram.

27. The generator as in claim 23, wherein when it is determined in step (3)(ii) that a plurality of maximum matchings exists, one of said plurality of maximum matchings is selected which has a largest level difference between matching pairs of nodes contained therein.

28. A generator as in claim 23, wherein step (f)(6) further comprises, for two adjacent nodes having identical second global coordinates, determining a local coordinate of said pin position placement of each of said two adjacent nodes to be identical to each other.

29. The generator as in claim 23, wherein step (f)(1)(vi) further comprises assigning a level M+1 to said disconnection node where already- level assigned start point nodes of input arcs thereto have a maximum already-assigned level M, or, where all start point nodes of input arcs to said disconnection node are non-level-assigned, locating a first level-assigned node on an output side of the disconnection node, determining a number of levels by which the disconnection node is separated from said first node and assigning a level to said disconnection node constituting a level of said first node less said number.

30. A schematic generating method, comprising:
(a) assigning levels to nodes of a net diagram by:
  (i) detecting loops formed by nodes and arcs in a net diagram;
  (ii) assigning a base level to ones of said nodes which have no inputting arc thereto;
  (iii) assigning a next level to each node with respect to which all nodes of input arcs thereto are level-assigned nodes, said next level being one level higher than a maximum level assigned to said level-assigned nodes;
  (iv) if all nodes have not yet been assigned with a level in steps (a)(ii) and (a)(iii), detecting locations at which a maximum overlapping of the loops detected in step (a)(i) exists, each of said locations comprising at least one arc by which at least two nodes are serially connected to one another;
  (v) determining a feedback arc among the locations detected in step (iv), said feedback arc including a disconnection node constituting an end point node of said feedback arc;
  (vi) thereafter, for nodes and arcs except feedback arcs, repeating steps (a)(ii), (a)(iii), (a)(iv) and (a)(v) until all nodes have been assigned with a level;
(b) determining positional relationships of said nodes in said net diagram at a reference level by:
  (i) determining all possible node pairs among said plurality of nodes;
  (ii) detecting one of a common ancestor node and a common descendent node for each of said node pairs;
  (iii) determining a total number of arcs from each node of said node pairs to said common ancestor node or said common descendent node;
  (iv) determining a level difference between each node of said node pairs and said common ancestor node or said common descendant node;
  (v) establishing a priority sequence among said node pairs, said priority sequence comprising assigning a higher priority to one of said node pairs having one of a smaller value of said total number of arcs determined in step (b)(iii) and a smaller maximum value of said level difference detected in step (b)(iv); and
  (vi) determining relative positions of said plurality of nodes in a hierarchy determined by said priority assigned in step (b)(v);
(c) sequentially determining node positions of all said nodes by:
  (i) providing a graph comprising a first set of said nodes for which positional relationships have been determined, a second set of said nodes for which positional relationships have not been determined, and connective relationships between said first set and said second set;
  (ii) determining a maximum matching between nodes in said first set and said second set;
  (iii) assigning identical relative locations to matching pairs of nodes identified in step (c)(ii) as part of said maximum matching; and
  (iv) with respect to a given node in said second set which is not selected in step (c)(ii) as part of a matching pair, determining a positional location thereof based on one of a direct or an indirect connective relationship with one of said nodes of said first set; and
(d) routing connecting lines between said nodes.

31. The method as in claim 30, further comprising:
(e) determining a first global coordinate from each of said levels assigned to said nodes in step (a) and a second global coordinate, which is orthogonal to said first global coordinate, from each of said node positions determined in step (c);
(f) determining local coordinates of said nodes, orientations of placement elements corresponding to said nodes and pin position placements of said placement elements based upon said first and second global coordinates determined in step (e) and connective relationship information and contour information relating to said placement elements;
(g) routing connecting lines in step (d) between said placement elements in accordance with said global coordinates and said local coordinates; and
(h) determining absolute coordinates of positions and routings of said placement elements based on said global coordinates and said local coordinates.

32. A schematic generator, comprising:
(a) means for assigning levels to nodes of a net diagram by performing the steps of:
  (i) detecting loops formed by nodes and arcs in a net diagram;
  (ii) assigning a base level to ones of said nodes which have no inputting arc thereto;
  (iii) assigning a next level to each node with respect to which all nodes of input arcs thereto are level-assigned nodes, said next level being one level higher than a maximum level assigned to said level-assigned nodes;
  (iv) if all nodes have not yet been assigned with a level in steps (a)(ii) and (a)(iii), detecting locations at which a maximum overlapping of the loops detected in step (a)(i) exists, each of said locations comprising at least one arc by which at least two nodes are serially connected to one another;
  (v) determining a feedback arc among the locations detected in step (a)(iv), said feedback arc including a disconnection node constituting an end point node of said feedback arc;
  (vi) assigning a level to said disconnection node;
  (vii) repeating steps (a)(ii) and (a)(iii) until all nodes except output nodes have been assigned with a level; and
  (viii) assigning a level N+1 to all output nodes, where N is a maximum level assigned to any of said nodes in steps (a)(ii) through (a)(vii);
(b) means for determining positional relationships of said nodes in said net diagram at a reference level by performing the steps of:
  (i) determining all possible node pairs among said plurality of nodes;
  (ii) detecting one of a common ancestor node and a common descendent node for each of said node pairs;
  (iii) determining a total number of arcs from each node of said node pairs to said common ancestor node or said common descendent node;
  (iv) determining a level difference between each node of said node pairs and said common ancestor node or said common descendent node;

(v) establishing a priority sequence among said node pairs, said priority sequence comprising assigning a higher priority to one of said node pairs having one of a smaller value of said total number of arcs determined in step (b)(iii) and a smaller maximum value of said level difference detected in step (b)(iv); and (vi) determining relative positions of said plurality of nodes in a hierarchy determined by said priority assigned in step (b)(v);

(c) means for sequentially determining node positions of all said nodes by performing the steps of:

(i) providing a graph comprising a first set of said nodes for which positional relationships have been determined, a second set of said nodes for which positional relationships have not been determined, and connective relationships between said first set and said second set;

(ii) determining a maximum matching between nodes in said first set and said second set;

(iii) assigning identical relative locations to matching pairs of nodes identified in step (c)(ii) as part of said maximum matching; and (iv) with respect to a given node in said second set which is not selected in step (c)(ii) as part of a matching pair, determining a positional location thereof based on one of a direct or an indirect connective relationship with one of said nodes of said first set; and (d) means for routing connecting lines between said nodes.

33. A schematic generating method, comprising:

(a) assigning levels to nodes of a net diagram by:

(i) detecting loops formed by nodes and arcs in a net diagram;

(ii) assigning a base level to ones of said nodes which have no inputting arc thereto;

(iii) assigning a next level to each node with respect to which all nodes of input arcs thereto are level-assigned nodes, said next level being one level higher than a maximum level assigned to said level-assigned nodes;

(iv) if all nodes have not yet been assigned with a level in steps (a)(ii) and (a)(iii), detecting locations at which a maximum overlapping of the loops detected in step (a)(i) exists, each of said locations comprising at least one arc by which at least two nodes are serially connected to one another;

(v) determining a feedback arc among the locations detected in step (iv), said feedback arc including a disconnection node constituting an end point node of said feedback arc;

(vi) assigning a level to said disconnection node;

(vii) repeating steps (a)(ii) and (a)(iii) until all nodes except output nodes have been assigned with a level; and (viii) assigning a level N+1 to all output nodes, where N is a maximum level assigned to any of said nodes in steps (a)(ii) through (a)(vii)

(b) sequentially determining node positions of all said nodes by:

(i) providing a graph comprising a first set of said nodes for which positional relationships have been determined, a second set of said nodes for which positional relationships have not been determined, and connective relationships between said first set and said second set;

(ii) determining a maximum matching between nodes in said first set and said second set;

(iii) assigning identical relative locations to matching pairs of nodes identified in step (b)(ii) as part of said maximum matching; and (iv) with respect to a given node in said second set which is not selected in step (b)(ii) as part of a matching pair, determining a positional location thereof based on one of a direct or an indirect connective relationship with one of said nodes of said first set.

34. A schematic generator for automatically generating a logic circuit, said generator comprising:

(a) first means for inputting connective information relating to a logic circuit;

(b) second means for storing information defining contours of placement elements in said logic circuit;

(c) third means for storing information relating to placements and routings of said placement elements in said logic circuit;

(d) fourth means for storing information relating to graphic symbols of said placement elements, said graphic symbol information preserving integrity with respect to said information stored in said second means;

(e) fifth means for drawing a logic circuit diagram based upon said information input by said first means, said information stored in said third means, and said information stored in said fourth means; and (f) processing means for executing the steps of:

(1) assigning levels to nodes of a net diagram by:

(i) detecting loops formed by nodes and arcs in a net diagram;

(ii) assigning a base level to ones of said nodes which have no inputting arc thereto;

(iii) assigning a next level to each node with respect to which all nodes of input arcs thereto are level-assigned nodes, said next level being one level higher than a maximum level assigned to said level-assigned nodes;

(iv) if all nodes have not yet been assigned with a level in steps (ii) and (iii), detecting locations at which a maximum overlapping of the loops detected in step (i) exists, each of said locations comprising at least one arc by which at least two nodes are serially connected to one another;

(v) determining a feedback arc among the locations detected in step (iv), said feedback arc including a disconnection node constituting an end point node of said feedback arc;

(vi) thereafter, for nodes and arcs except feedback arcs, repeating steps (ii), (iii), (iv) and (v) until all nodes have been assigned with a level;

(2) determining positional relationships of said nodes in said net diagram at a reference level by:

(i) determining all possible node pairs among said plurality of nodes;

(ii) detecting one of a common ancestor node and a common descendent node for each of said node pairs;

(iii) determining a total number of arcs from each node of said node pairs to said common ancestor node or said common descendent node;

(iv) determining a level difference between each node of said node pairs and said common ancestor node or said common descendant node;

(v) establishing a priority sequence among said node pairs, said priority sequence comprising assigning a higher priority to one of said node pairs having one of a smaller value of said total number of arcs determined in step (2)(iii) and a smaller maximum value of said level difference detected in step (2)(iv); and (vi) determining relative positions of said plurality of nodes in a hierarchy determined by said priority assigned in step (2)(v);

(3) sequentially determining node positions of all said nodes by:
  (i) providing a graph comprising a first set of said nodes for which positional relationships have been determined, a second set of said nodes for which positional relationships have not been determined, and connective relationships between said first set and said second set;
  (ii) determining a maximum matching between nodes in said first set and said second set;
  (iii) assigning identical relative locations to matching pairs of nodes identified in step (3)(ii) as part of said maximum matching; and
  (iv) with respect to a given node in said second set which is not selected in step (3)(ii) as part of a matching pair, determining a positional location thereof based on one of a direct or an indirect connective relationship with one of said nodes of said first set; and (4) routing connecting lines between said nodes; and thereafter sequentially (5) determining a first global coordinate from each of said levels assigned to said nodes in step (1) and a second global coordinate, which is orthogonal to said first global coordinate, from each of said node positions determined in step (3);

(6) determining local coordinates of said nodes, orientations of placement elements corresponding to said nodes and pin position placements of said placement elements based upon said first and second global coordinates determined in step (5) and connective relationship information and contour information relating to said placement elements;

(7) routing connecting lines between said placement elements in accordance with said global coordinates and said local coordinates; and (8) determining absolute coordinates of positions and routings of said placement elements based on said global coordinates and said local coordinates, so as to attain information associated with placements and routings of said logic circuit diagram for provision to said third means.

35. A method according to any one of claims 6, 9, 29, 32, 34, wherein said graph is a bipartite graph.

36. A schematic generation method for automatically generating a logic circuit, comprising:
  (a) inputting connective information relating to a logic circuit;
  (b) storing information defining contours of placement elements in said logic circuit;
  (c) storing information relating to placements and routings of said placement elements in said logic circuit;
  (d) storing information relating to graphic symbols of said placement elements, said graphic symbol information preserving integrity with respect to said information stored by step (b);
  (e) drawing a logic circuit diagram based upon said information input in step (a), said information stored by step (c), and said information stored by step (d); and
  (f) executing a processing operation by performing the steps of:
    (1) assigning levels to nodes of a net diagram by:
      (i) detecting loops formed by nodes and arcs in a net diagram;
      (ii) assigning a base level to ones of said nodes which have no inputting arc thereto;
      (iii) assigning a next level to each node with respect to which all nodes of input arcs thereto are level-assigned nodes, said next level being one level higher than a maximum level assigned to said level-assigned nodes;
      (iv) if all nodes have not yet been assigned with a level in steps (ii) and (iii), detecting locations at which a maximum overlapping of the loops detected in step (i) exists, each of said locations comprising at least one arc by which at least two nodes are serially connected to one another;
      (v) determining a feedback arc among the locations detected in step (iv), said feedback arc including a disconnection node constituting an end point node of said feedback arc; and
      (vi) thereafter, for nodes and arcs except feedback arcs, repeating steps (ii), (iii), (iv) and (v) until all nodes have been assigned with a level;
    (2) determining positional relationships of said nodes in said net diagram at a reference level by:
      (i) determining all possible node pairs among said plurality of nodes;
      (ii) detecting one of a common ancestor node and a common descendent node for each of said node pairs;
      (iii) determining a total number of arcs from each node of said node pairs to said common ancestor node or said common descendent node;
      (iv) determining a level difference between each node of said node pairs and said common ancestor node or said common descendant node;
      (v) establishing a priority sequence among said node pairs, said priority sequence comprising assigning a higher priority to one of said node pairs having one of a smaller value of said total number of arcs determined in step (2)(iii) and a smaller maximum value of said level difference detected in step (2)(iv); and
      (vi) determining relative positions of said plurality of nodes in a hierarchy determined by said priority assigned in step (2)(v);
    (3) sequentially determining node positions of all said nodes by:
      (i) providing a graph comprising a first set of said nodes for which positional relationships have been determined, a second set of said nodes for which positional relationships have not been determined, and connective relationships between said first set and said second set;
      (ii) determining a maximum matching between nodes in said first set and said second set;
      (iii) assigning identical relative locations to matching pairs of nodes identified in step (3)(ii) as part of said maximum matching; and
      (iv) with respect to a given node in said second set which is not selected in step (3)(ii) as part of a matching pair, determining a positional location thereof based on one of a direct or an indirect connective relationship with one of said nodes of said first set; and (4) routing connecting lines between said nodes; and thereafter sequentially (5) determining a first global coordinate from each of said levels assigned to said nodes in step (1) and a second global coordinate, which is orthogonal to said first global coordinate, from each of said node positions determined in step (3);

(6) determining local coordinates of said nodes, orientations of placement elements corresponding to said nodes and pin position placements of said placement elements based upon said first and second global coordinates determined in step (5) and connective relationship information and contour information relating to said placement elements;

(7) routing connecting lines between said placement elements in accordance with said global coordinates and said local coordinates; and (8) determining absolute coordinates of positions and routings of said placement elements based on said global coordinates and said local coordinates, so as to attain information associated with placements and routings of said logic circuit diagram for provision to said third means.

37. A schematic generation method for automatically generating a logic circuit, comprising:

(a) inputting connective information relating to a logic circuit;

(b) storing information defining contours of placement elements in said logic circuit;

(c) storing information relating to placements and routings of said placement elements in said logic circuit;

(d) storing information relating to graphic symbols of said placement elements, said graphic symbol information preserving integrity with respect to said information stored by step (b);

(e) drawing a logic circuit diagram based upon said information input in step (a), said information stored by step (c), and said information stored by step (d); and (f) executing a processing operation by performing the steps of:

(1) assigning levels to nodes of a net diagram by:
  (i) detecting loops formed by nodes and arcs in a net diagram;
  (ii) assigning a base level to ones of said nodes which have no inputting arc thereto;
  (iii) assigning a next level to each node with respect to which all nodes of input arcs thereto are level-assigned nodes, said next level being one level higher than a maximum level assigned to said level-assigned nodes;
  (iv) if all nodes have not yet been assigned with a level in steps (ii) and (iii), detecting locations at which a maximum overlapping of the loops detected in step (i) exists, each of said locations comprising at least one arc by which at least two nodes are serially connected to one another;
  (v) determining a feedback arc among the locations detected in step (ii), said feedback arc including a disconnection node constituting an end point node of said feedback arc;
  (vi) assigning a level to said disconnection node;
  (vii) repeating steps (ii) and (iii) until all nodes except output nodes have been assigned with a level; and
  (viii) assigning a level N+1 to all output nodes, where N is a maximum level assigned to any of said nodes in steps (ii) through (vii);

(2) determining positional relationships of said nodes in said net diagram at a reference level by:
  (i) determining all possible node pairs among said plurality of nodes;
  (ii) detecting one of a common ancestor node and a common descendent node for each of said node pairs;
  (iii) determining a total number of arcs from each node of said node pairs to said common ancestor node or said common descendent node;
  (iv) determining a level difference between each node of said node pairs and said common ancestor node or said common descendant node;
  (v) establishing a priority sequence among said node pairs, said priority sequence comprising assigning a higher priority to one of said node pairs having one of a smaller value of said total number of arcs determined in step (2)(iii) and a smaller maximum value of said level difference detected in step (2)(iv); and
  (vi) determining relative positions of said plurality of nodes in a hierarchy determined by said priority assigned in step (2)(v);

(3) sequentially determining node positions of all said nodes by:
  (i) providing a graph comprising a first set of said nodes for which positional relationships have been determined, a second set of said nodes for which positional relationships have not been determined, and connective relationships between said first set and said second set;
  (ii) determining a maximum matching between nodes in said first set and said second set;
  (iii) assigning identical relative locations to matching pairs of nodes identified in step (3)(ii) as part of said maximum matching; and
  (iv) with respect to a given node in said second set which is not selected in step (3)(ii) as part of a matching pair, determining a positional location thereof based on one of a direct or an indirect connective relationship with one of said nodes of said first set; and (4) routing connecting lines between said nodes; and thereafter sequentially (5) determining a first global coordinate from each of said levels assigned to said nodes in step (1) and a second global coordinate, which is orthogonal to said first global coordinate, from each of said node positions determined in step (3);

(6) determining local coordinates of said nodes, orientations of placement elements corresponding to said nodes and pin position placements of said placement elements based upon said first and second global coordinates determined in step (5) and connective relationship information and contour information relating to said placement elements;

(7) routing connecting lines between said placement elements in accordance with said global coordinates and said local coordinates; and (8) determining absolute coordinates of positions and routings of said placement elements based on said global coordinates and said local coordinates, so as to attain information associated with placements and routings of said logic circuit diagram for provision to said third means.

38. A system for routing connecting lines between nodes of a network diagram by routing said connecting lines in at least one region between two adjacent columns or rows of said nodes, said system comprising the following means (a), (b) and (c), operative for a case of routing at least some of said connecting lines in a same region between said two adjacent columns or rows:

(a) means for determining, for each of a plurality of said connecting lines, a virtual routing length by measuring a length of said each of said plurality of said connecting lines in a direction of said same region between and parallel with said two adjacent columns or rows and from a position of a bending point from which said each of said plurality of said connecting lines bends to extend in a direction orthogonal to said direction of said region and if any one of said plurality of said connecting lines has no bending point, assigning a given virtual routing length thereto;

(b) means for sorting said plurality of said connecting lines in accordance with their respective virtual routing lengths determined by means (a) to determine a routing sequence; and (c) means for routing said plurality of said connecting lines in said same region in accordance with said routing sequence determined by means (b).

39. A generator according to any one of claims 23, 30, 33, 37, 38, wherein said graph is a bipartite graph.

40. A system as in claim 38, wherein means (b) comprises means for sorting said plurality of said connecting lines in said same region in order of their respective virtual routing lengths determined by means (a).

41. A system for sequentially routing connecting lines in a space between parallel linear arrays of adjacent columns or adjacent rows of nodes of a network diagram, said system comprising:

(a) means for determining routing paths based upon positional relationships between start point nodes and end point nodes respectively associated with said connecting lines in said space;

(b) means for determining routing patterns based on said positional relationships and for sorting said routing patterns to establish a preset sequence of said routing patterns; and (c) means for performing a routing operation for said connecting lines in said space in accordance with said routing paths determined by means (a), in accordance with a sequence including:
  (i) determining for each of said connecting lines a virtual routing length from positions of bending points thereof and if any one of said connecting lines has no bending point, assigning a given virtual routing length thereto; and
  (ii) sorting and routing said connecting lines in said space in said routing paths in accordance with a sequence determined by said preset sequence of said routing patterns and said respective virtual routing lengths determined in step (i).

42. A schematic generator for automatically generating a logic circuit, said generator comprising:

(a) first means for inputting connective information relating to a logic circuit;

(b) second means for storing information defining contours of placement elements in said logic circuit;

(c) third means for storing information relating to placements and routings of said placement elements in said logic circuit;

(d) fourth means for storing information relating to graphic symbols of said placement elements, said graphic symbol information preserving integrity with respect to said information stored in said second means;

(e) fifth means for drawing a logic circuit diagram based upon said information input by said first means, said information stored in said third means, and said information stored in said fourth means; and (f) processing means for executing the steps of:

(1) assigning levels to nodes of a net diagram by:
  (i) detecting loops formed by nodes and arcs in a net diagram;
  (ii) assigning a base level to ones of said nodes which have no inputting arc thereto;
  (iii) assigning a next level to each node with respect to which all nodes of input arcs thereto are level-assigned nodes, said next level being one level higher than a maximum level assigned to said level-assigned nodes;
  (iv) if all nodes have not yet been assigned with a level in steps (ii) and (iii), detecting locations at which a maximum overlapping of the loops detected in step (i) exists, each of said locations comprising at least one arc by which at least two nodes are serially connected to one another;
  (v) determining a feedback arc among the locations detected in step (ii), said feedback arc including a disconnection node constituting an end point node of said feedback arc;
  (vi) assigning a level to said disconnection node;
  (vii) repeating steps (ii) and (iii) until all nodes except output nodes have been assigned with a level; and
  (viii) assigning a level N+1 to all output nodes, where N is a maximum level assigned to any of said nodes in steps (ii) through (vii);

(2) sequentially determining node positions of all said nodes by:
  (i) providing a graph comprising a first set of said nodes for which positional relationships have been determined, a second set of said nodes for which positional relationships have not been determined, and connective relationships between said first set and said second set;
  (ii) determining a maximum matching between nodes in said first set and said second set;
  (iii) assigning identical relative locations to matching pairs of nodes identified in step (2)(ii) as part of said maximum matching; and
  (iv) with respect to a given node in said second set which is not selected in step (2)(ii) as part of a matching pair, determining a positional location thereof based on one of a direct or an indirect connective relationship with one of said nodes of said first set; and (3) routing connecting lines between said nodes; and thereafter sequentially:

(4) determining a first global coordinate from each of said levels assigned to said nodes in step (1) and a second global coordinate, which is orthogonal to said first global coordinate, from each of said node positions determined in step (2);

(5) determining local coordinates of said nodes, orientations of placement elements corresponding to said nodes and pin position placements of said placement elements based upon said first and second global coordinates determined in step (4) and connective relationship information and contour information relating to said placement elements;

(6) routing connecting lines between said placement elements in accordance with said global coordinates and said local coordinates; and (7) determining absolute coordinates of positions and routings of said placement elements based on said global coordinates and said local coordinates, so as to attain information associated with placements and routings of said logic circuit diagram for provision to said third means.

43. A schematic generating method, comprising:
(a) assigning levels to nodes of a net diagram by:
  (i) detecting loops formed by nodes and arcs in a net diagram;
  (ii) assigning a base level to ones of said nodes which have no inputting arc thereto;
  (iii) assigning a next level to each node with respect to which all nodes of input arcs thereto are level-assigned nodes, said next level being one level higher than a maximum level assigned to said level-assigned nodes;
  (iv) if all nodes have not yet been assigned with a level in steps (a)(ii) and (a)(iii), detecting locations at which a maximum overlapping of the loops detected in step (a)(i) exists, each of said locations comprising at least one arc by which at least two nodes are serially connected to one another;
  (v) determining a feedback arc among the locations detected in step (iv), said feedback arc including a disconnection node constituting an end point node of said feedback arc;
  (v) thereafter, for nodes and arcs except feedback arcs, repeating steps (a)(ii), (a)(iii), (a)(iv) and (a)(v) until all nodes have been assigned with a level; and
(b) sequentially determining node positions of all said nodes by:
  (i) providing a graph comprising a first set of said nodes for which positional relationships have been determined, a second set of said nodes for which positional relationships have not been determined, and connective relationships between said first set and said second set;
  (ii) determining a maximum matching between nodes in said first set and said second set;
  (iii) assigning identical relative locations to matching pairs of nodes identified in step (b)(ii) as part of said maximum matching; and
  (iv) with respect to a given node in said second set which is not selected in step (b)(ii) as part of a matching pair, determining a positional location thereof based on one of a direct or an indirect connective relationship with one of said nodes of said first set.

44. A network routing method for sequentially routing connecting lines between nodes in a network diagram, said connecting lines extending in at least one region between adjacent rows or columns of nodes, said method comprising the steps of:
(a) presetting routing patterns in dependence upon positional relationships between start positions and end positions of said connecting lines in each of said at least one region;
(b) sorting said routing patterns preset in step (a) to preset a routing pattern sequence of said routing patterns;
(c) determining routing paths for said connecting lines in accordance with the routing patterns preset in step (a) and in dependence upon positional relationships of start-point nodes and end-point nodes to be connected by the connecting lines;
(d) sorting said routing paths determined in step (c) in accordance with the routing pattern sequence preset in step (b) to obtain a routing path sequence; and
(e) routing the routing paths determined in step (c) in accordance with the routing path sequence obtained in step (d).

45. A schematic generator for automatically generating a logic circuit, said generator comprising:
(a) first means for inputting connective information relating to a logic circuit;
(b) second means for storing information defining contours of placement elements in said logic circuit;
(c) third means for storing information relating to placements and routings of said placement elements in said logic circuit;
(d) fourth means for storing information relating to graphic symbols of said placement elements, said graphic symbol information preserving integrity with respect to said information stored in said second means;
(e) fifth means for drawing a logic circuit diagram based upon said information input by said first means, said information stored in said third means, and said information stored in said fourth means; and
(f) processing means for executing the steps of:
(1) assigning levels to nodes of a net diagram by:
  (i) detecting loops formed by nodes and arcs in a net diagram;
  (ii) assigning a base level to ones of said nodes which have no inputting arc thereto;
  (iii) assigning a next level to each node with respect to which all nodes of input arcs thereto are level-assigned nodes, said next level being one level higher than a maximum level assigned to said level-assigned nodes;
  (iv) if all nodes have not yet been assigned with a level in steps (ii) and (iii), detecting locations at which a maximum overlapping of the loops detected in step (i) exists, each of said locations comprising at least one arc by which at least two nodes are serially connected to one another;
  (v) determining a feedback arc among the locations detected in step (ii), said feedback arc including a disconnection node constituting an end point node of said feedback arc;
  (vi) assigning a level to said disconnection node;
  (vii) repeating steps (ii) and (iii) until all nodes except output nodes have been assigned with a level; and
  (viii) assigning a level N+1 to all output nodes, where N is a maximum level assigned to any of said nodes in steps (ii) through (vii);
(2) determining positional relationships of said nodes in said net diagram at a reference level by:
  (i) determining all possible node pairs among said plurality of nodes;
  (ii) detecting one of a common ancestor node and a common descendent node for each of said node pairs;
  (iii) determining a total number of arcs from each node of said node pairs to said common ancestor node or said common descendent node;
  (iv) determining a level difference between each node of said node pairs and said common ancestor node or said common descendant node;

(v) establishing a priority sequence among said node pairs, said priority sequence comprising assigning a higher priority to one of said node pairs having one of a smaller value of said total number of arcs determined in step (2)(iii) and a smaller maximum value of said level difference detected in step (2)(iv); and (vi) determining relative positions of said plurality of nodes in a hierarchy determined by said priority assigned in step (2)(v);

(3) sequentially determining node positions of all said nodes by:

(i) providing a graph comprising a first set of said nodes for which positional relationships have been determined, a second set of said nodes for which positional relationships have not been determined, and connective relationships between said first set and said second set;

(ii) determining a maximum matching between nodes in said first set and said second set;

(iii) assigning identical relative locations to matching pairs of nodes identified in step (3)(ii) as part of said maximum matching; and (iv) with respect to a given node in said second set which is not selected in step (3)(ii) as part of a matching pair, determining a positional location thereof based on one of a direct or an indirect connective relationship with one of said nodes of said first set; and (4) routing connecting lines between said nodes; and thereafter sequentially (5) determining a first global coordinate from each of said levels assigned to said nodes in step (1) and a second global coordinate, which is orthogonal to said first global coordinate, from each of said node positions determined in step (3);

(6) routing connecting lines between said placement elements in accordance with said global coordinates; and (7) determining absolute coordinates of positions and routings of said placement elements based on said global coordinates, so as to attain information associated with placements and routings of said logic circuit diagram for provision to said third means.

* * * * *